US011258919B2

(12) United States Patent
Ishikawa

(10) Patent No.: US 11,258,919 B2
(45) Date of Patent: Feb. 22, 2022

(54) METHOD OF CONTROLLING PLURALITY OF FEEDING APPARATUSES SEQUENTIALLY CONNECTED TO IMAGE FORMING APPARATUS

(71) Applicant: CANON KABUSHIKI KAISHA, Tokyo (JP)

(72) Inventor: Naoki Ishikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/913,816

(22) Filed: Jun. 26, 2020

(65) Prior Publication Data

US 2021/0006683 A1 Jan. 7, 2021

(30) Foreign Application Priority Data

Jul. 1, 2019 (JP) ............................ JP2019-123132

(51) Int. Cl.

*H04N 1/12* (2006.01)
*H04N 1/23* (2006.01)
*H04N 1/00* (2006.01)
*G06F 3/12* (2006.01)

(52) U.S. Cl.

CPC ......... *H04N 1/121* (2013.01); *H04N 1/00793* (2013.01); *H04N 1/2307* (2013.01)

(58) Field of Classification Search

CPC .......... B65H 2405/31; B65H 2405/331; B65H 2405/332; B65H 5/26; B65H 3/44; H04N 1/121; H04N 1/00793; H04N 1/2307
USPC ..... 358/498, 434, 1.11–1.18; 271/9.01, 9.08, 271/9.09, 9.11, 9.12
See application file for complete search history.

(56) References Cited

U.S. PATENT DOCUMENTS

| | | | | |
|---|---|---|---|---|
| 4,980,780 A | | 12/1990 | Tanaka | |
| 5,126,786 A | * | 6/1992 | Tanaka | G03G 15/50 355/46 |
| 6,293,536 B1 | * | 9/2001 | Boehmer | G03G 15/6502 271/9.11 |
| 6,801,329 B1 | * | 10/2004 | Urabe | H04N 1/0083 358/1.13 |
| 7,050,751 B2 | * | 5/2006 | Watanabe | G03G 15/6558 399/391 |
| 8,054,475 B2 | * | 11/2011 | Takahashi | G06K 15/16 358/1.12 |

(Continued)

FOREIGN PATENT DOCUMENTS

JP 02-236614 A 9/1990

*Primary Examiner* — Chad Dickerson
(74) *Attorney, Agent, or Firm* — Venable LLP

(57) ABSTRACT

When a feeding apparatus of a first type is connected to a first mounting surface, a processor outputs, to the feeding apparatus of the first type via a first signal terminal, a control signal. When the feeding apparatus of the first type is connected to a second mounting surface, the control unit outputs, to a feeding apparatus of a second type via a second signal terminal, a control command for controlling the feeding apparatus of the first type. When the feeding apparatus of the first type is connected to the second mounting surface, the feeding apparatus of the second type outputs, to the feeding apparatus of the first type via another signal terminal, a control signal based on a control command for controlling the feeding apparatus of the first type outputted from an image forming apparatus.

4 Claims, 18 Drawing Sheets

(56) References Cited

U.S. PATENT DOCUMENTS

| | | | | |
|---|---|---|---|---|
| 8,670,686 | B2 * | 3/2014 | Ito | G03G 21/16 399/75 |
| 2003/0025263 | A1 * | 2/2003 | Koga | B65H 3/44 271/9.12 |
| 2003/0048474 | A1 * | 3/2003 | Hong | B65H 3/44 358/1.15 |
| 2007/0086045 | A1 * | 4/2007 | Nishikata | G03G 15/5075 358/1.15 |
| 2007/0120313 | A1 * | 5/2007 | Wada | B65H 19/18 271/9.02 |
| 2008/0197558 | A1 * | 8/2008 | Nishimura | B65H 3/44 271/10.03 |
| 2009/0243187 | A1 * | 10/2009 | Adachi | G03G 15/6514 271/9.09 |
| 2009/0302521 | A1 * | 12/2009 | Kondo | G03G 15/6502 271/9.01 |
| 2010/0066012 | A1 * | 3/2010 | Yamazaki | G03G 15/50 271/270 |
| 2011/0217107 | A1 * | 9/2011 | Usui | B41J 11/44 400/582 |
| 2013/0264763 | A1 * | 10/2013 | Oyama | G03G 15/6511 271/2 |
| 2015/0229783 | A1 * | 8/2015 | Mizoguchi | H04N 1/0032 358/498 |
| 2015/0331642 | A1 * | 11/2015 | Arai | G06F 3/1231 358/1.13 |

* cited by examiner

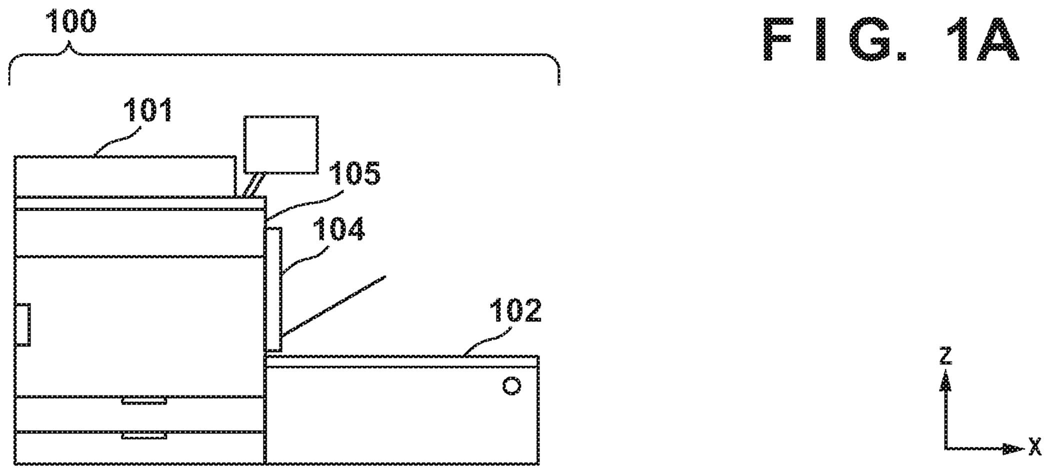
FIG. 1A
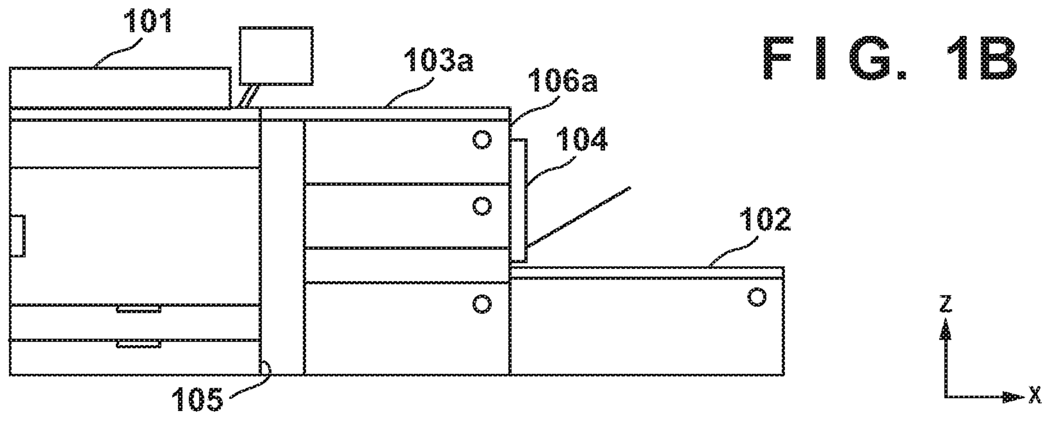
FIG. 1B
FIG. 1C
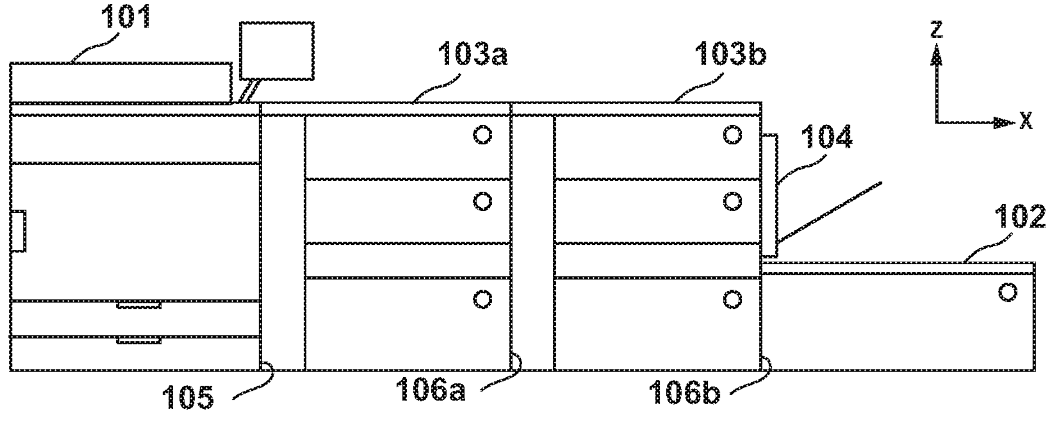

METHOD OF CONTROLLING PLURALITY OF FEEDING APPARATUSES SEQUENTIALLY CONNECTED TO IMAGE FORMING APPARATUS

BACKGROUND OF THE INVENTION

Field of the Invention

The present invention relates to a method for controlling a plurality of feeding apparatuses sequentially connected to an image forming apparatus.

Description of the Related Art

There are cases in which in order to execute post-processing such as folding processing or stapling and punching processing, a plurality of post-processing apparatuses are connected sequentially downstream in a sheet conveyance direction to an image forming apparatus. In recent years, there is demand for a plurality of feeding apparatuses to be connected upstream in a sheet conveyance direction. In particular, there is a demand for the supply of a wide variety of sheets and the supply of a large number of sheets in POD (print on-demand). U.S. Pat. No. 4,980,780 proposes connecting in parallel a plurality of feeding apparatus to an image forming apparatus.

In the invention described in U.S. Pat. No. 4,980,780, a plurality of post-processing apparatuses and a plurality of feeding apparatuses are controlled via a common signal line. Note that there are feeding apparatuses that are to be directly connected to an image forming apparatus. For convenience of explanation, such feeding apparatuses will be referred to as manual feeding units. With a manual feeding unit, it is not possible for other feeding apparatuses to communicate with the image forming apparatus via a common signal line. For example, if the image forming apparatus and the manual feeding unit are directly connected via another signal cable other than the common signal line, the image forming apparatus should be able to control such a manual feeding unit. However, in the case where a manual feeding unit is connected sequentially together with a plurality of feeding apparatuses to the image forming apparatus, the length of the signal cable differs depending on the number of feeding apparatuses present between the image forming apparatus and the manual feeding unit. In other words, the user must prepare a specific one of a plurality of lengths of signal cables, and usability suffers. Hypothetically, when another feeding apparatus is added between the image forming apparatus and the manual feeding unit to the image forming apparatus to which the manual feed unit is attached, a longer signal cable becomes necessary.

SUMMARY OF THE INVENTION

The present invention provides an image forming system comprising an image forming apparatus and a feeding apparatus configured to feed a sheet to the image forming apparatus. The image forming apparatus comprises: a first mounting surface to which a feeding apparatus of a first type and a feeding apparatus of a second type can be connected; a first signal terminal configured to output a control signal from the image forming apparatus to the feeding apparatus of the first type in a case where the first type feeding apparatus is connected to a first mounting surface; a second signal terminal configured to communicate a signal with the feeding apparatus of the second type in a case where the feeding apparatus of the second type is connected to the first mounting surface; an acceptance port configured to accept a sheet fed from the feeding apparatus of the first type or of the second type; and at least one processor configured to generate a control signal to be outputted to the first signal terminal or the second signal terminal. The feeding apparatus of the second type comprises a second mounting surface to which the feeding apparatus of the first type can connect; a third signal terminal configured to be connected with the second signal terminal via a first cable; and a fourth signal terminal configured to output a control signal with the feeding apparatus of the first type in a case where the feeding apparatus of the first type is connected to the second mounting surface. The feeding apparatus of the first type comprises a fifth signal terminal configured to be connected to the first signal terminal of the image forming apparatus via a second cable in a case where the feeding apparatus of the first type is connected to the first mounting surface of the image forming apparatus, and connected to the fourth signal terminal of the feeding apparatus of the second type via the second cable in a case where the feeding apparatus of the first type is connected to the second mounting surface of the feeding apparatus of the second type. The at least one processor is configured to in a case where the feeding apparatus of the first type is connected to the first mounting surface, output, to the feeding apparatus of the first type via the first signal terminal, a control signal, and in a case where the feeding apparatus of the first type is connected to the second mounting surface, output, to the feeding apparatus of the second type via the second signal terminal, a control command for controlling the feeding apparatus of the first type. The feeding apparatus of the second type is configured to, in a case where the feeding apparatus of the first type is connected to the second mounting surface, output, to the feeding apparatus of the first type via the fourth signal terminal, a control signal based on a control command for controlling the feeding apparatus of the first type outputted from the image forming apparatus.

Further features of the present invention will become apparent from the following description of exemplary embodiments (with reference to the attached drawings).

BRIEF DESCRIPTION OF THE DRAWINGS

FIGS. 1A to 1C are views illustrating a front of an image forming system.

DESCRIPTION OF THE EMBODIMENTS

Figure 2A:
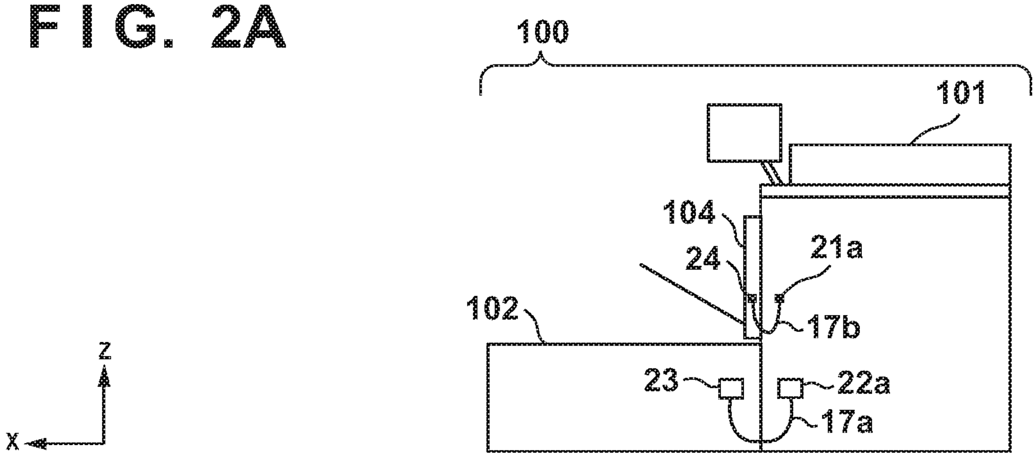
FIGS. 2A to 2C are views illustrating a back of the image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. The lowercase alphabet letters appended to the end of reference signs are appended in order to distinguish the same type or similar elements. Accordingly, when matters common to the plurality of elements are described, the lowercase alphabet letters on the end of the reference signs will be omitted.

First Embodiment

<Image Forming System>

As FIG. 1A illustrates, an image forming apparatus 101 of an image forming system 100 includes a mounting surface 105. A manual feeding unit 104 is connected to an upper part of the mounting surface 105. The manual feeding unit 104 may be referred to as a manual feeding apparatus. The manual feeding unit 104 includes a tray, and feeds a sheet placed on the tray by a user to the image forming apparatus 101. A long sheet feeding deck 102 is connected to a lower part of the mounting surface 105. The long sheet feeding deck 102 feeds a long size type sheet to the image forming apparatus 101. The image forming apparatus 101 forms an image on the sheet and then discharges the sheet.

As FIG. 1B illustrates, a feeding deck 103*a* in which many sheets can be contained may be connected to the mounting surface 105 of the image forming apparatus 101. A connecting surface 106*a* of the feeding deck 103*a* is of a shape compatible with the mounting surface 105 of the image forming apparatus 101. Therefore, the long sheet feeding deck 102 and the manual feeding unit 104 can be connected to the connecting surface 106*a* of the feeding deck 103*a*. The feeding deck 103*a* supplies the image forming apparatus 101 with not only sheets held in its own storage compartment, but also sheets fed from the long sheet feeding deck 102 and the manual feeding unit 104. In the following description, when similar or common matters are illustrated, the lowercase alphabet letters on the end of the reference signs may be omitted.

As FIG. 1C illustrates, a feeding deck 103*b* of the same type as the feeding deck 103*a* can be connected to the connecting surface 106*a* of the feeding deck 103*a*. A connecting surface 106*b* of the feeding deck 103*b* is compatible with forms associated with the mounting surface 105 and the connecting surface 106*a*. Therefore, the long sheet feeding deck 102 and the manual feeding unit 104 can also be connected to the connecting surface 106*b*. The feeding deck 103*b*, via the feeding deck 103*a*, supplies the image forming apparatus 101 with not only sheets held in its own storage compartment, but also sheets fed from the long sheet feeding deck 102 and the manual feeding unit 104. The feeding deck 103*a* transfers sheets supplied from the feeding deck 103*b* to the image forming apparatus 101.

<Cables>

FIG. 2A is a view from a rear side of the image forming system 100 illustrated in FIG. 1A. The image forming apparatus 101 includes a terminal 21*a* and a terminal 22*a*. The manual feeding unit 104 includes a terminal 24. The terminal 21*a* is connected to the terminal 24 via a cable 17*b*. The image forming apparatus 101 supplies the manual feeding unit 104 with control signals and power via the cable 17*b*. The long sheet feeding deck 102 includes a terminal 23. The terminal 23 is connected to the terminal 22*a* via a cable 17*a*. The image forming apparatus 101 supplies the long sheet feeding deck 102 with control signals and power via the cable 17*a*. Note that the terminal 21 may be a connector connecting a cable 17. The terminal 21 may be arranged within an apparatus housing, and does not need to be arranged at the back of the housing.

The image forming apparatus 101 may communicate with the long sheet feeding deck 102 by serial communication. In this case, the cable 17*a* may include a clock line and a control line for serial communication. On the other hand, the terminal 24 may be directly connected to a motor and a sensor arranged within the manual feeding unit 104. In this case, since the image forming apparatus 101 and the manual feeding unit 104 do not execute communication, the cable 17*b* does not need to be equipped with a clock line and a control line for serial communication. The cable 17*b*, for example, may include a drive line through which the drive current to the motor is supplied and a signal line for conveying a detection signal of the sensor.

Figure 2B:
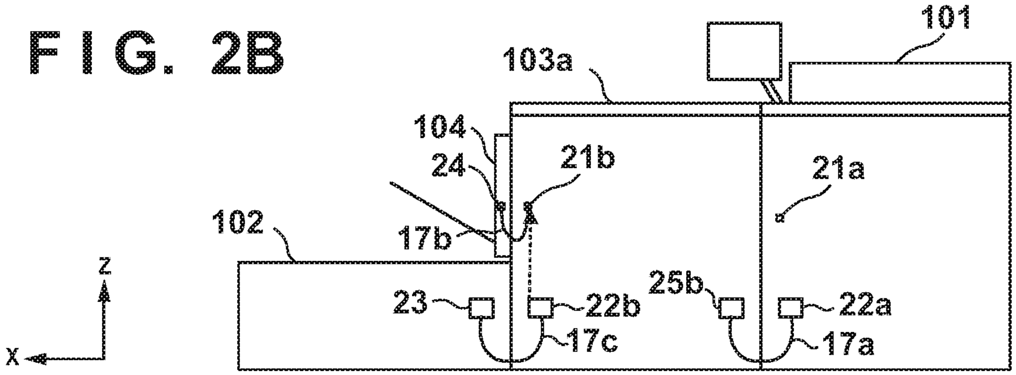
Figure 2C:
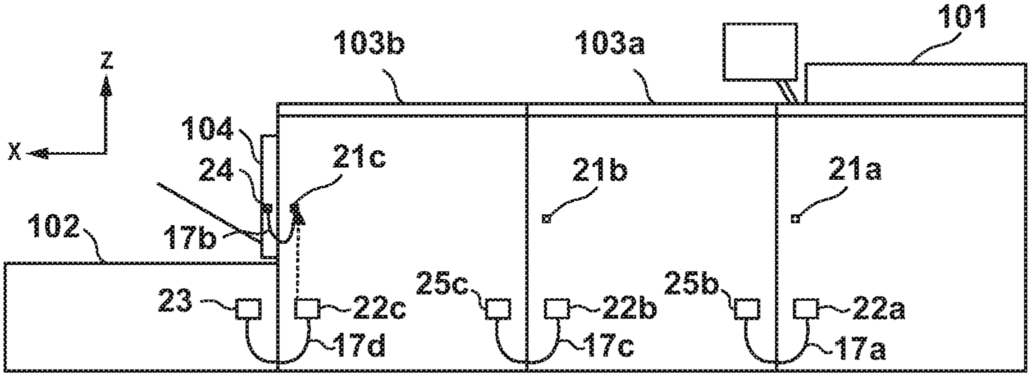

FIG. 2B and FIG. 2C are views from a rear side of the image forming system 100 illustrated in FIG. 1B and FIG. 1C. As FIG. 2B and FIG. 2C illustrate, the feeding deck 103*a* includes a terminal 25*b* connected to the terminal 22*a* of the image forming apparatus 101 via the cable 17*a*. In addition, the feeding deck 103*a* includes a terminal 22*b* to be connected, via a cable 17*c*, to the terminal 23 of the long sheet feeding deck 102 or a terminal 25*c* of the feeding deck 103*b*. The feeding deck 103*a* includes a terminal 21*b* connected to the terminal 24 of the manual feeding unit 104 via the cable 17*b*. The feeding deck 103*a* converts control commands received via the cable 17*a* to generate control signals (the drive current and the driving pulse), and supplies the manual feeding unit 104 with these via the cable 17*b*.

The feeding deck 103*b* includes the terminal 25*c* to be connected to the terminal 22*b* of the feeding deck 103*a* via the cable 17*c*. The feeding deck 103*b* includes a terminal 22*c* to be connected to the terminal 23 of the long sheet feeding deck 102 via a cable 17*d*. The feeding deck 103*b* includes a terminal 21*c* to be connected to the terminal 24 of the manual feeding unit 104 via the cable 17*b*. The feeding deck 103*b* converts a control command received via the cables 17*a* and 17*c* to generate a control signal (a drive current), and supplies it to the manual feeding unit 104 via the cable 17*b*.

Here, the feeding deck 103*a* may be the same product as the feeding deck 103*b*. In addition, the terminals 21*a* to 21*c* may have compatibility. Similarly, the terminals 22*a* to 22*c* may have compatibility. The terminals 23, 25*b*, and 25*c* may have compatibility, too. In this case, the cables 17*a*, 17*c*, and 17*d* may have compatibility, too.

In this way, the cables 17*a* to 17*d* each connect two adjacent apparatuses. Thus, the length of the cables 17*a* to 17*d* may be comparably short. For example, when directly connecting the terminal 21*a* of the image forming apparatus 101 to the terminal 24 of the manual feeding unit 104 in the connection configurations illustrated in FIG. 2B and FIG. 2C, a longer cable is required. This is because there are one or more feeding decks 103 between the image forming apparatus 101 and the manual feeding unit 104. In the present embodiment, the control signals that had been directly supplied from the image forming apparatus 101 to the manual feeding unit 104 and the long sheet feeding deck 102 are indirectly supplied to these from the image forming apparatus 101. Specifically, the feeding deck 103 directly connected to the manual feeding unit 104 and the long sheet feeding deck 102 supplies the control signals to the manual feeding unit 104 and the long sheet feeding deck 102. Thereby, the cables connected to the manual feeding unit 104 and the long sheet feeding deck 102 become shorter.

<Internal Mechanism>

Figure 3:
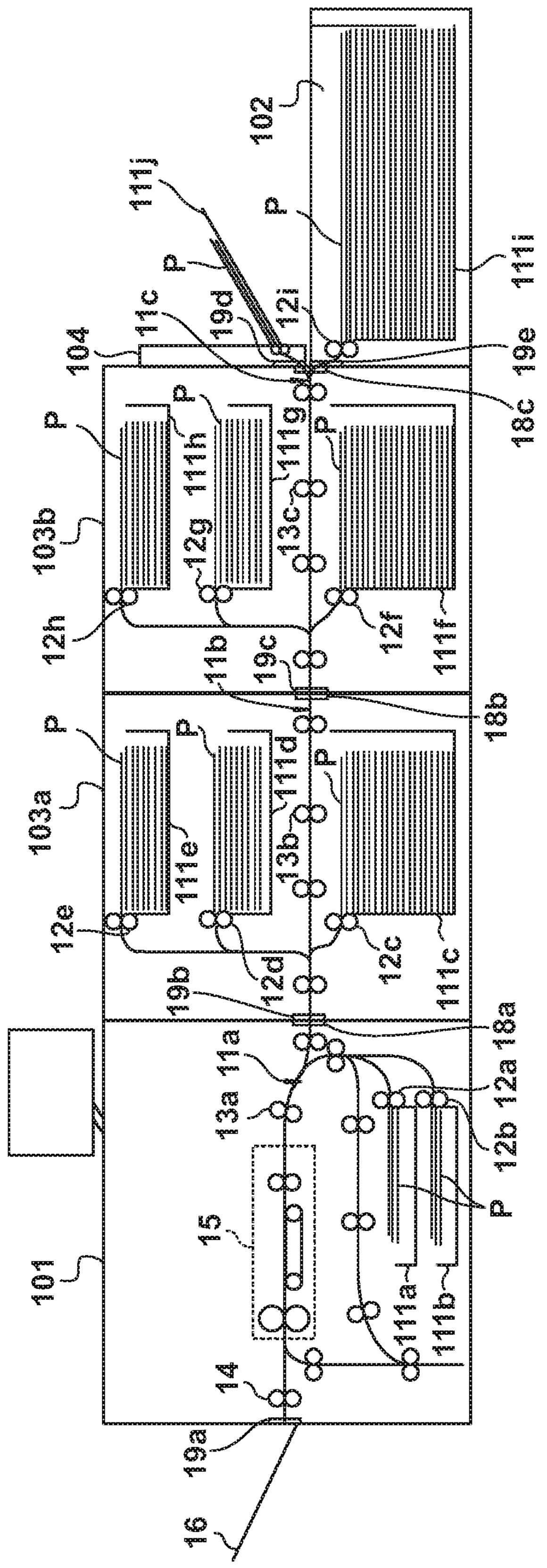
FIG. 3 is a view illustrating an internal configuration of the image forming system.

FIG. 3 illustrates an internal mechanism of the image forming system 100. The image forming apparatus 101, the long sheet feeding deck 102, the feeding deck 103, and the manual feeding unit 104 each include a feeding stage 111. The feeding stage 111 is a container or a tray containing many sheets P. A feeding roller 12 is a roller which pulls up a sheet P contained in the feeding stage 111 to feed it to a conveyance path. A conveyance roller 13 conveys the sheet P from upstream to downstream on the conveyance path. Note that a conveyance path of the feeding apparatus positioned upstream is connected to a conveyance path of the feeding apparatus positioned downstream in conveyance direction of the sheet P. For example, an outlet 19*d* of the conveyance path of the manual feeding unit 104 and an outlet 19*e* of the conveyance path of the long sheet feeding deck 102 are connected to an inlet 18*c* of the conveyance path of the feeding deck 103*b*. An outlet 19*c* of the conveyance path of the feeding deck 103*b* is connected to an inlet 18*b* of the conveyance path of the feeding deck 103*a*. The outlet 19*b* of the conveyance path of the feeding deck 103*a* is connected to an inlet 18*a* of the conveyance path of the image forming apparatus 101. In this way, the sheet P is handed over from the outlet 19 to the inlet 18. Note that a sheet sensor 11 which detects a sheet P is arranged at the inlet 18.

The image forming apparatus 101 includes an imaging forming unit 15. The imaging forming unit 15 forms an image on the sheet P fed from one of the feeding stages 111. A discharge roller 14 discharges the sheet P from an outlet 19*a* to a discharge tray 16. For example, the image forming method of the imaging forming unit 15 may be any of an electrographic method, an electrostatic recording method, an inkjet method, or the like.

<Control Unit>

Figure 4:
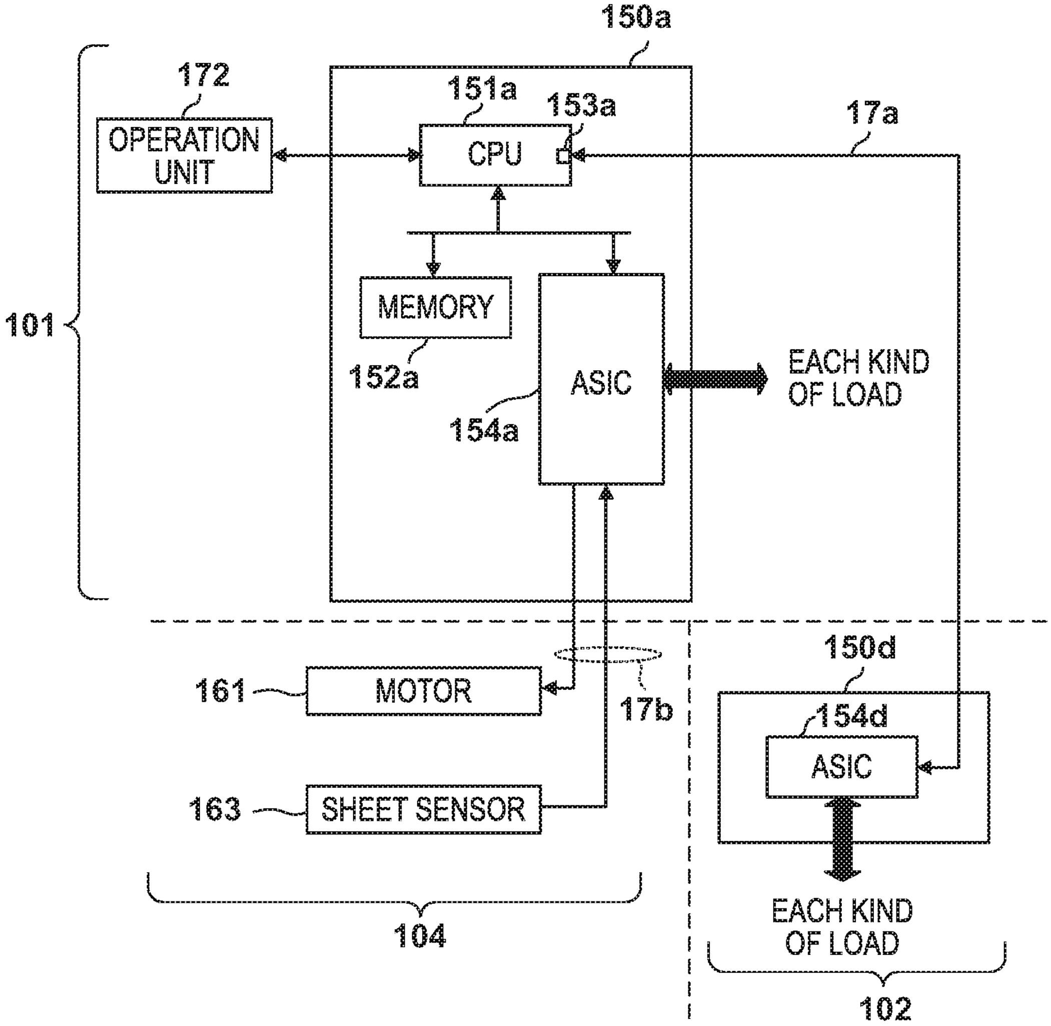
FIG. 4 is a view illustrating controllers of the image forming system.

FIG. 4 illustrates a control unit 150*a* of the image forming apparatus 101 in the image forming system 100, a control unit 150*d* of the long sheet feeding deck 102, and a group of loads in the manual feeding unit 104 illustrated in FIG. 1A (FIG. 2A). The control unit 150*a* includes a CPU 151*a*, a memory 152*a*, and an ASIC 154*a*. The CPU 151*a* is configured with at least one processor circuitry and controls the image forming system 100 by executing the control program stored in the ROM of the memory 152*a*. The ASIC 154*a* includes a driving circuit that drives a motor that drives the imaging forming unit 15, the conveyance roller 13, and the like arranged in the image forming apparatus 101. The ASIC 154*a* drives each kind of load in accordance with control commands outputted from the CPU 151*a*. The CPU 151*a* accepts a user instruction via an operation unit 172. CPU is an abbreviation for Central Processing Unit. ASIC is an abbreviation for Application Specific Integrated Circuit. ROM is an abbreviation for Read-Only Memory.

The CPU 151*a* is connected via the cable 17*a* to an ASIC 154*d* within the control unit 150*d* arranged in the long sheet feeding deck 102. The CPU 151*a* may execute serial communication with the ASIC 154*d* via an IO port 153*a* and the cable 17*a* to execute transmission and reception of commands and responses. The IO port 153*a* may be the serial communication port for executing serial communication. Note that IO is an abbreviation for Input and Output. The ASIC 154*a* arranged in the control unit 150*a* of the image forming apparatus 101 drives a motor 161 of the manual feeding unit 104 via the cable 17*b* and receives the detection signal of a sheet sensor 163. Note that the manual feeding unit 104 does not include a control unit such as a CPU or an ASIC.

Figure 5:
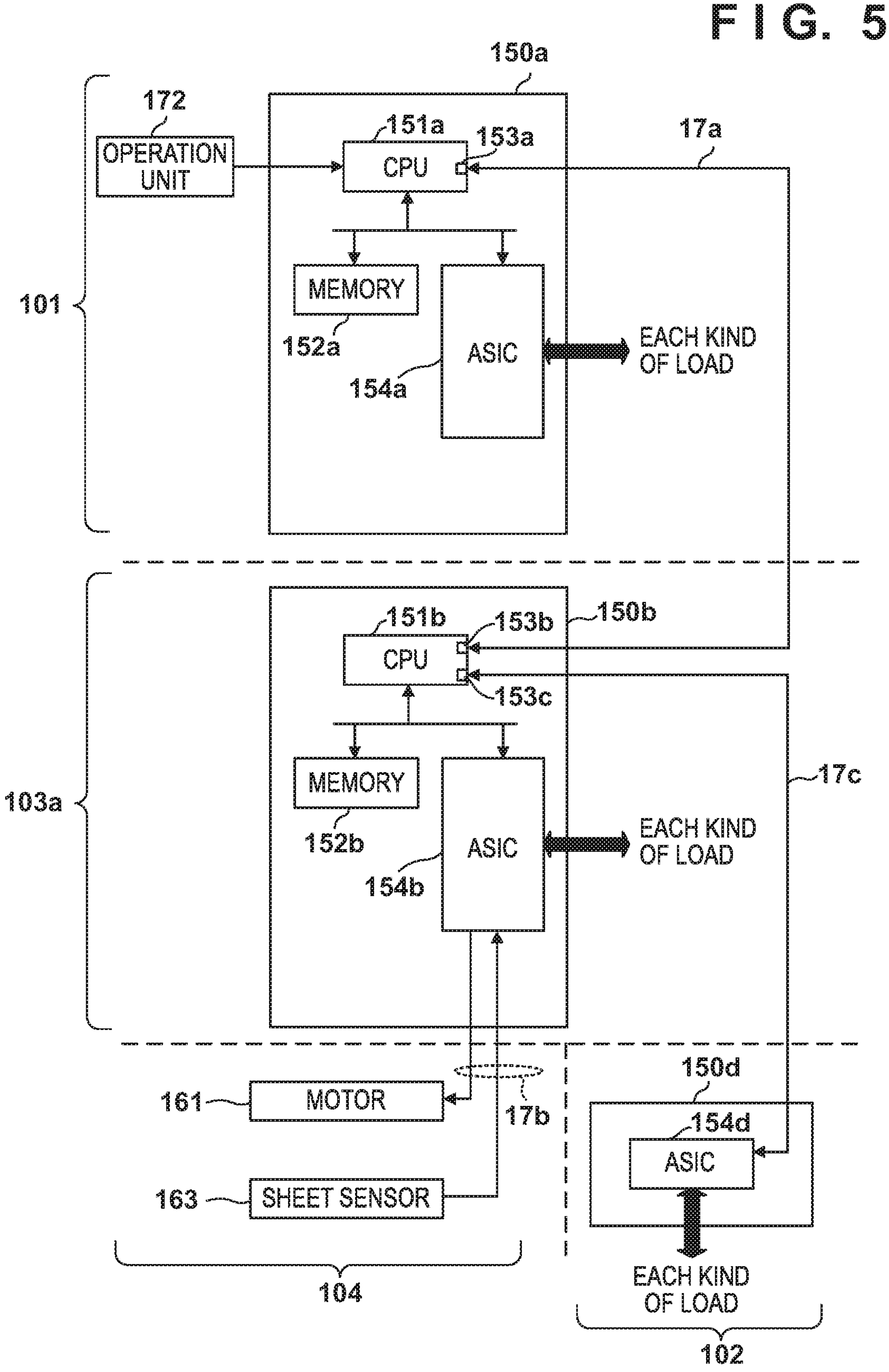
FIG. 5 is a view illustrating controllers of the image forming system.

FIG. 5 illustrates control units and a group of loads of the image forming system 100 illustrated in FIG. 1B (FIG. 2B). The feeding deck 103*a* includes a control unit 150*b*. The control unit 150*b* includes a CPU 151*b*, a memory 152*b*, and an ASIC 154*b*. The CPU 151*b* is configured with at least one processor circuitry and controls the feeding deck 103*a*, the manual feeding unit 104, and the long sheet feeding deck 102 by executing a control program stored in the ROM of the memory 152*b*. In other words, the control unit 150*b* controls the manual feeding unit 104 and the long sheet feeding deck 102 instead of the control unit 150*a*. The ASIC 154*b* includes a driving circuit that drives a motor that drives the feeding roller 12, the conveyance roller 13, and the like arranged in the feeding deck 103. The ASIC 154*b* drives each kind of load in accordance with control commands outputted from the CPU 151*b*.

The CPU 152*b* is connected to the ASIC 154*d* of the control unit 150*d* arranged in the long sheet feeding deck 102 via an IO port 153*c* and the cable 17*c*. The CPU 152*b* executes serial communication with the ASIC 154*d* via the cable 17*c* to execute transmission and reception of commands and responses. Furthermore, the CPU 151*b* is connected to the CPU 151*a* of the image forming apparatus 101 via an IO port 153*b* and the cable 17*a*, and executes serial communication. The CPU 152*b* transfers to the ASIC 154*d* a feeding command for the long sheet feeding deck 102 transmitted from the CPU 151*a*. The IO ports 153*b* and 153*c* may be serial communication ports for executing serial communication.

The CPU 151*b* transmits to the ASIC 154*b* a control signal to drive the motor 161 based on a feeding command of the manual feeding unit 104 transmitted from the CPU 151*a*. The ASIC 154*b* generates a drive current or a driving pulse based on this control signal and drives the motor 161 by supplying it to the motor 161. Also, the ASIC 154*b* outputs a detection result indicated by the detection signal of the sheet sensor 163 on the CPU 151*b*. The CPU 151*b* transmits the detection result to the CPU 151*a* of the image forming apparatus 101.

Figure 6:
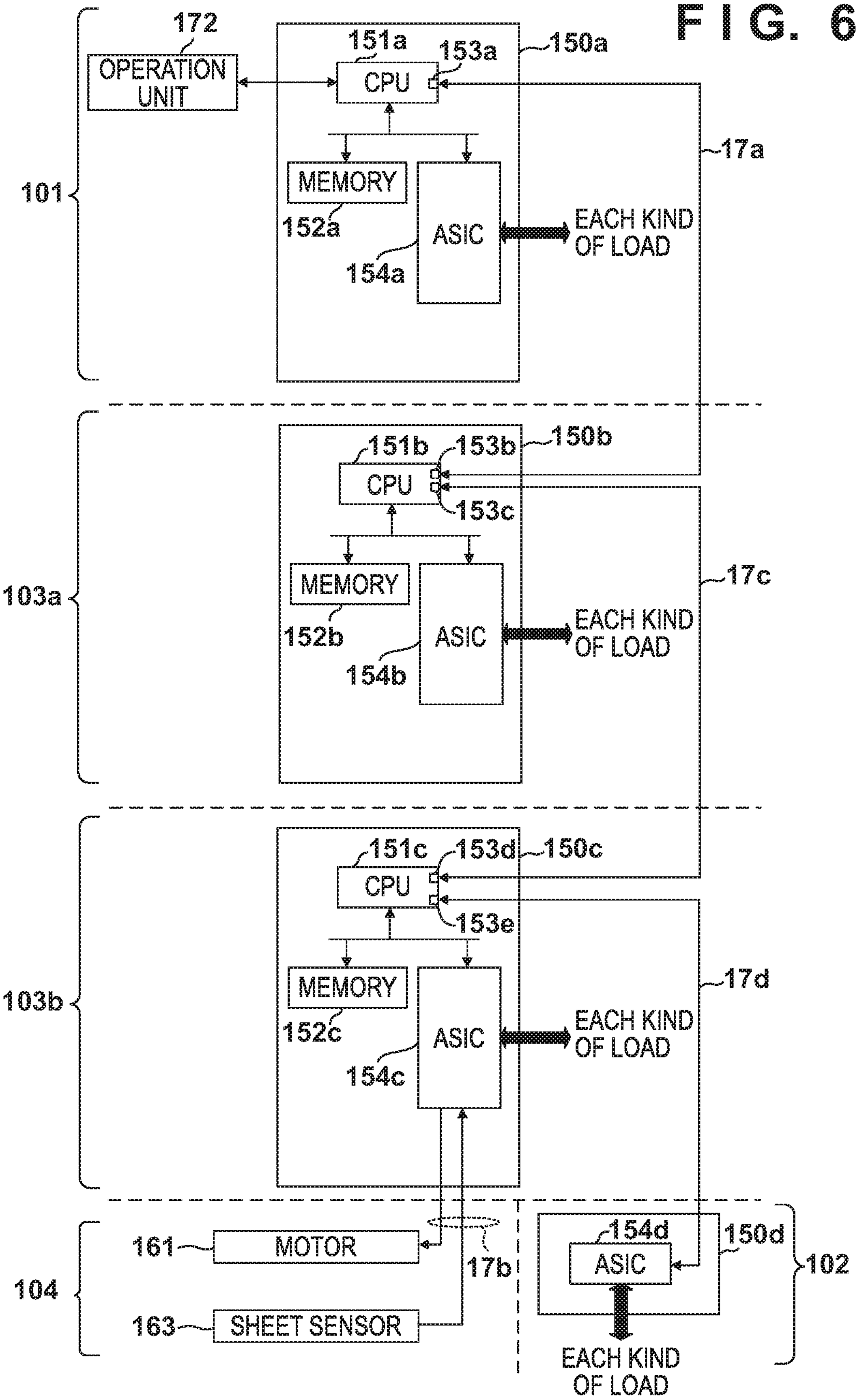
FIG. 6 is a view illustrating controllers of the image forming system.

FIG. 6 illustrates control units and a group of loads of the image forming system 100 illustrated in FIG. 1C (FIG. 2C). As FIG. 6 illustrates, the same configuration is employed for the control unit 150*b* of the feeding deck 103*a* and a control unit 150*c* of the feeding deck 103*b*. In particular, the CPU 152*b* of the feeding deck 103*a* transfers to a CPU 151*c* of the feeding deck 103*b* commands addressed to the feeding deck

**103*b*, the manual feeding unit 104, and the long sheet feeding deck 102, from among commands received from the image forming apparatus 101. As FIG. 6 illustrates, the CPU 151*b* of the feeding deck 103*a* and the CPU 151*c* of the feeding deck 103*b* are connected via the cable 17*d*. Specifically, the CPU 151*c* is configured with at least one processor circuitry and includes IO ports 153*d* and 153*e*. The IO port 153*d* is connected to the IO port 153*c* via the cable 17*c*. An IO port 153*e* is connected to the ASIC 154*d* via the cable 17*d*. The CPU 151*c* of the feeding deck 103*b* transmits to the CPU 151*b* of the feeding deck 103*a* a detection result indicated by the detection signal of the sheet sensor 163. The CPU 151*b* of the feeding deck 103*a* transfers the detection result to the CPU 151*a* of the image forming apparatus 101**.

The ASIC **154*a* of the image forming apparatus 101 detects, when the image forming apparatus 101 starts, whether or not the manual feeding unit 104 is connected to the image forming apparatus 101, and outputs the detection result to the CPU 151*a*. Also, the CPU 151*a* detects whether or not the feeding deck 103 or the long sheet feeding deck 102 is connected to the image forming apparatus 101**.

Similarly, the ASIC **154*b* of the feeding deck 103*a* detects, when the image forming apparatus 101 starts, whether or not the manual feeding unit 104 is connected, and outputs the detection result to the CPU 151*b*. Similarly, an ASIC 154*c* of the feeding deck 103*b* detects, when the image forming apparatus 101 starts, whether or not the manual feeding unit 104 is connected, and outputs the detection result to the CPU 151*c*. The CPUs 151*b* and 151*c* transmit detection results of the manual feeding unit 104 to the CPU 151*a* of the image forming apparatus 101. The CPUs 151*b* and 151*c* detect whether or not another feeding deck or the long sheet feeding deck 102 is connected to the feeding deck 103. The CPUs 151*b* and 151*c* transmit the result of detection of another feeding deck or the long sheet feeding deck 102 to the CPU 151*a* of the image forming apparatus 101. Note that the CPU 151*b* of the feeding deck 103*a* transfers the detection result received from the CPU 151*c* of the feeding deck 103*b* to the CPU 151*a* of the image forming apparatus 101**.

The CPU **151*a* of the image forming apparatus 101 may recognize the type of a feeding apparatus and the connection position of a feeding apparatus configuring the image forming system 100 based on a detection result received from the ASIC 154*a* and a detection result received from the feeding deck 103. The CPU 151*a* may write, to the RAM of the memory 152*a*, configuration information 804*a* indicating the type of a feeding apparatus and the connection position of a feeding apparatus. For example, when the CPU 151*a* recognizes the manual feeding unit 104 is connected to the image forming apparatus 101 by referring to the configuration information 804*a*, it outputs a control command for the manual feeding unit 104 to the ASIC 154*a*. When the CPU 151*a* recognizes that the manual feeding unit 104 is connected to the feeding deck 103*a* by referencing the configuration information 804*a*, it outputs a control command of the manual feeding unit 104 to the CPU 151*b* of the feeding deck 103*a*. When the CPU 151*a* recognizes that the manual feeding unit 104 is connected to the feeding deck 103*b* by referencing the configuration information 804*a*, it outputs a control command for the manual feeding unit 104 with the CPU 151*c* of the feeding deck 103*b*** as the destination.

<Flow Chart>

Processing Executed by the Control Unit of the Image Forming Apparatus

Figure 7:
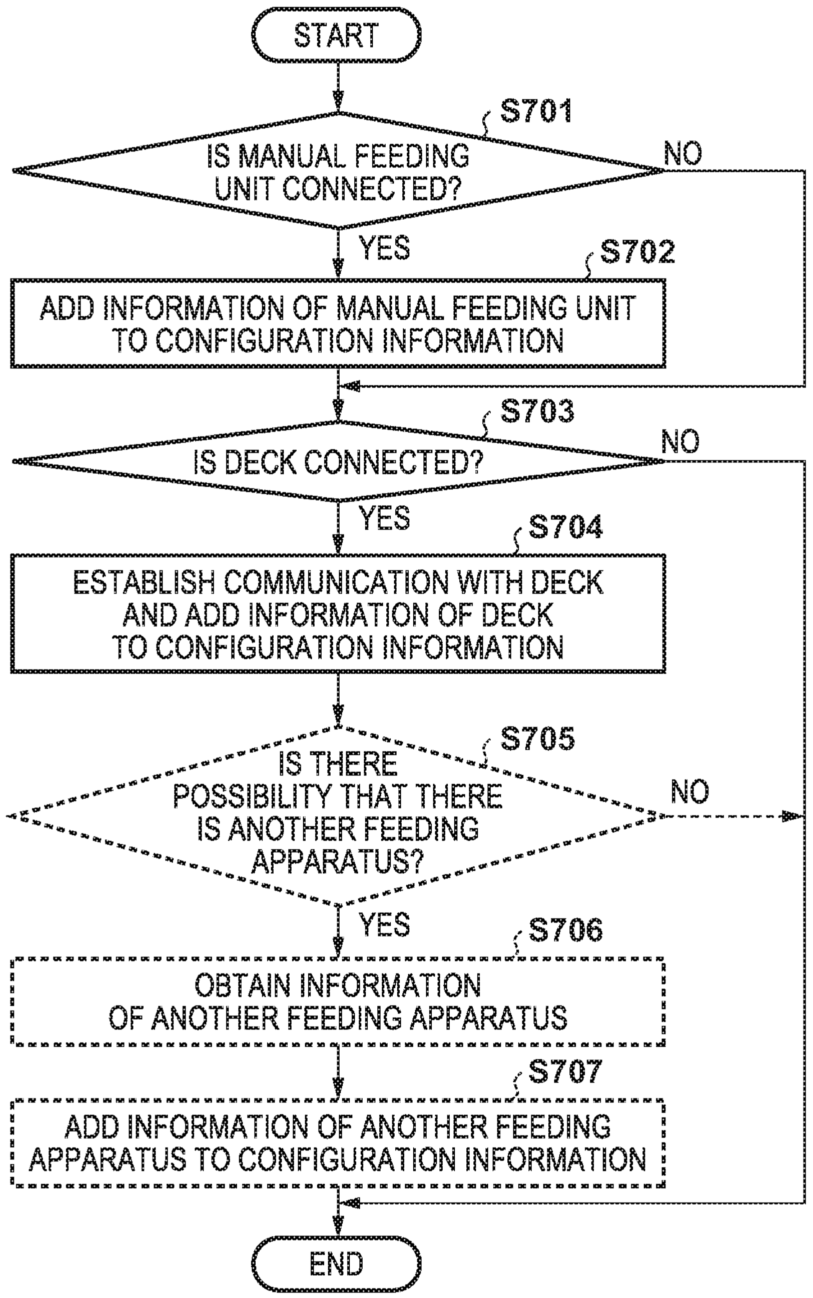
FIG. 7 is a flow chart illustrating a feeding apparatus connection confirmation.
Figure 8:
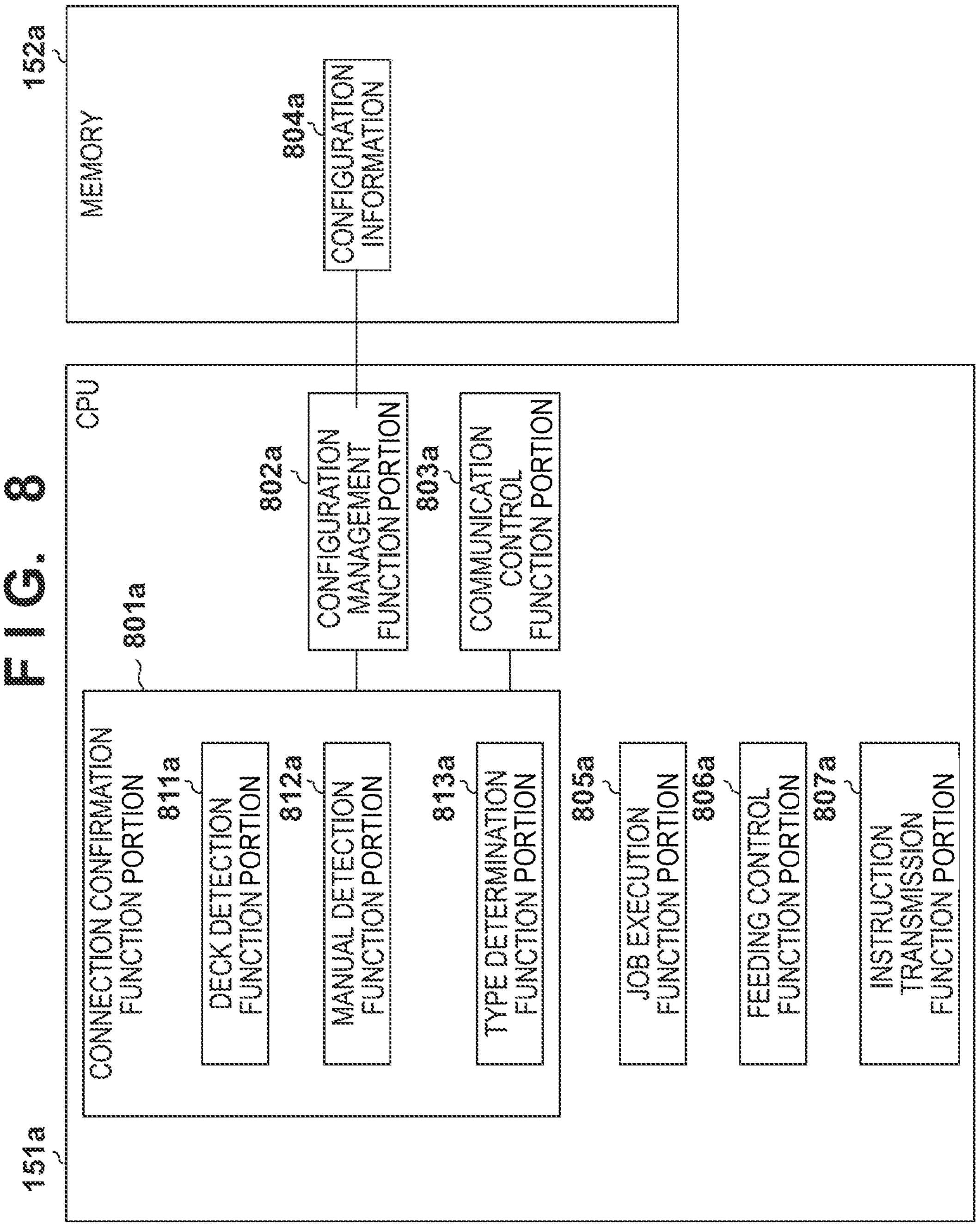
FIG. 8 is a block diagram illustrating functions of a CPU.

FIG. 7 illustrates a feeding apparatus connection confirmation executed by the CPU **151*a* of the image forming apparatus 101. FIG. 8 illustrates functions that are realized by the CPU 151*a* executing a control program. When power is supplied to the image forming system 100 from a power supply, the CPU 151*a*** executes the following processing.

In step S701, the CPU **151*a* (a manual detection function portion 812*b* of a connection confirmation function portion 801*a*) detects whether or not the manual feeding unit 104 is connected to the image forming apparatus 101. The connection confirmation function portion 801*a* executes a function for confirming whether or not another feeding apparatus is connected to the image forming apparatus 101 and the feeding deck 103. For example, based on a switch or a sensor provided on the mounting surface 105 and the logic of the terminal, the manual detection function portion 812*b* may determine whether or not there is a connection of the manual feeding unit 104. This logic is decided by the ASIC 154*a* and outputted to the CPU 151*a*. For example, the logic is high when the manual feeding unit 104 is connected to the image forming apparatus 101, and the logic is low when the manual feeding unit 104 is not connected to the image forming apparatus 101. Alternatively, the manual detection function portion 812*b* may execute a determination of a connection based on a connection detection signal that is outputted by the manual feeding unit 104. If the manual feeding unit 104 is connected to the image forming apparatus 101, the CPU 151*a* advances the processing to S702. If the manual feeding unit 104 is not connected to the image forming apparatus 101, the CPU 151*a* advances the processing to S703**.

In step S702, the CPU **151*a* (a configuration management function portion 802*a*) adds information indicating that the manual feeding unit 104 is connected to the image forming apparatus 101 to the configuration information 804*a*. The configuration information 804*a* is information for managing an existence or absence of the various feeding apparatuses configuring the image forming system 100 and connection positions, and is stored in the memory 152*a***.

In step S703, the CPU **151*a* (a deck detection function portion 811*a*) determines whether or not decks such as the feeding deck 103 and the long sheet feeding deck 102 are connected to the image forming apparatus 101. For example, based on a switch or a sensor provided on the mounting surface 105 and the logic of the terminal, the deck detection function portion 811*a* may determine whether or not there is a connection of the deck. Here, a deck is a feeding apparatus for which a communication establishment is necessary, such as the feeding deck 103 and the long sheet feeding deck 102. In a case where a deck is connected, the CPU 151*a* advances the processing to step S704. In a case where a deck is not connected, the CPU 151*a*** finishes a connection confirmation.

In step S704, the CPU **151*a* (a communication control function portion 803*a*) establishes communication with a deck that is connected to the upstream side of the image forming apparatus 101, obtains configuration information of the deck, and adds the information to the configuration information 804*a*. Here, configuration information of the deck that is connected beside the image forming apparatus 101 may include specification information of that deck. The specification information may include information indicating a number of feeding stages and sheet sizes which the deck is provided with. As FIG. 1B illustrates, in a case where the manual feeding unit 104 and the long sheet feeding deck 102 are connected to the feeding deck 103*a*, configuration information obtained from the feeding deck 103*a* may include presence information and specification information for the manual feeding unit 104 and the long sheet feeding deck 102. The presence information is information indicating an existence or absence of a connection of the manual feeding unit 104 or the long sheet feeding deck 102. The presence information and specification information of the feeding apparatus present on the upstream side may be obtained by one communication, or may be obtained by a plurality of communications as follows. In a case where configuration information obtained from a feeding deck includes presence information and specification information for a feeding apparatus present on the upstream side, step S705 through step S707** are omitted.

In step S705, the CPU 151*a* (a type determination function portion 813*a*) determines whether or not there is a possibility that another feeding apparatus is present on the upstream side based on specification information obtained from the adjacent deck. The specification information may include information indicating whether the adjacent deck can further connect another feeding apparatus. If the deck cannot connect another feeding apparatus or is not connected to another feeding apparatus, the CPU 151*a* ends the connection confirmation. If there is a possibility that the deck is connected to another feeding apparatus, the CPU 151*a* advances the processing to step S706.

In step S706, the CPU 151*a* (the type determination function portion 813*a*) obtains this information from an adjacent deck by transmitting, to the adjacent the deck, a command to obtain information of another feeding apparatus connected to the adjacent deck.

In step S707, the CPU 151*a* (the configuration management function portion 802*a*) adds another feeding apparatus to the configuration information 804*a*. For example, the configuration management function portion 802*a* adds a connection position, specification information, or the like of another feeding apparatus to the configuration information 804*a*. In the case of FIG. 1B, information indicating that the manual feeding unit 104 and the long sheet feeding deck 102 are connected to the adjacent feeding deck 103*a* is added to the configuration information 804*a*. In the case of FIG. 1C, information indicating that the feeding deck 103*b* is connected to the feeding deck 103*a* and the manual feeding unit 104 and the long sheet feeding deck 102 are connected to the feeding deck 103*b* is added to the configuration information 804*a*. Also, specification information of the long sheet feeding deck 102 and the feeding deck 103*b* (for example: a number of feeding stages, a sheet size and an existence or absence of a sheet) is also added to the configuration information 804*a*.

In FIG. 8, a job execution function portion 805*a* controls the image forming apparatus 101 and the like and executes a print job. A sheet feed control function portion 806*a* feeds a sheet from the feeding stage that is designated by a print job, and controls a conveyance of a sheet in the conveyance path. An instruction transmission function portion 807*a* transmits designation information of the feeding stage and a feeding command to the feeding apparatus on an upstream side via a communication control function portion 803*b*.

Processing Executed by a Control Unit of the Feeding Deck

Figure 9:
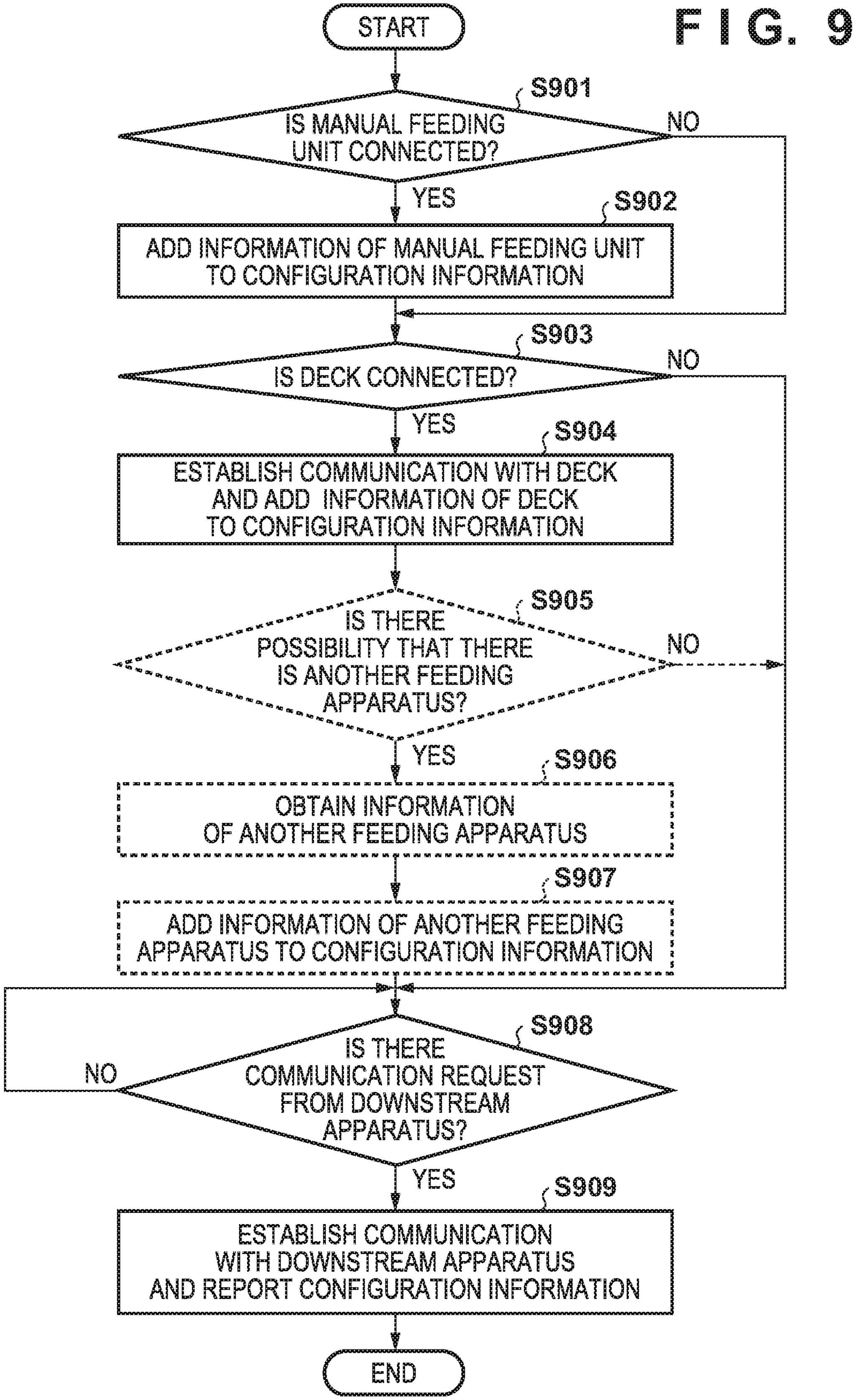
FIG. 9 is a flow chart illustrating the feeding apparatus connection confirmation.
Figure 10:
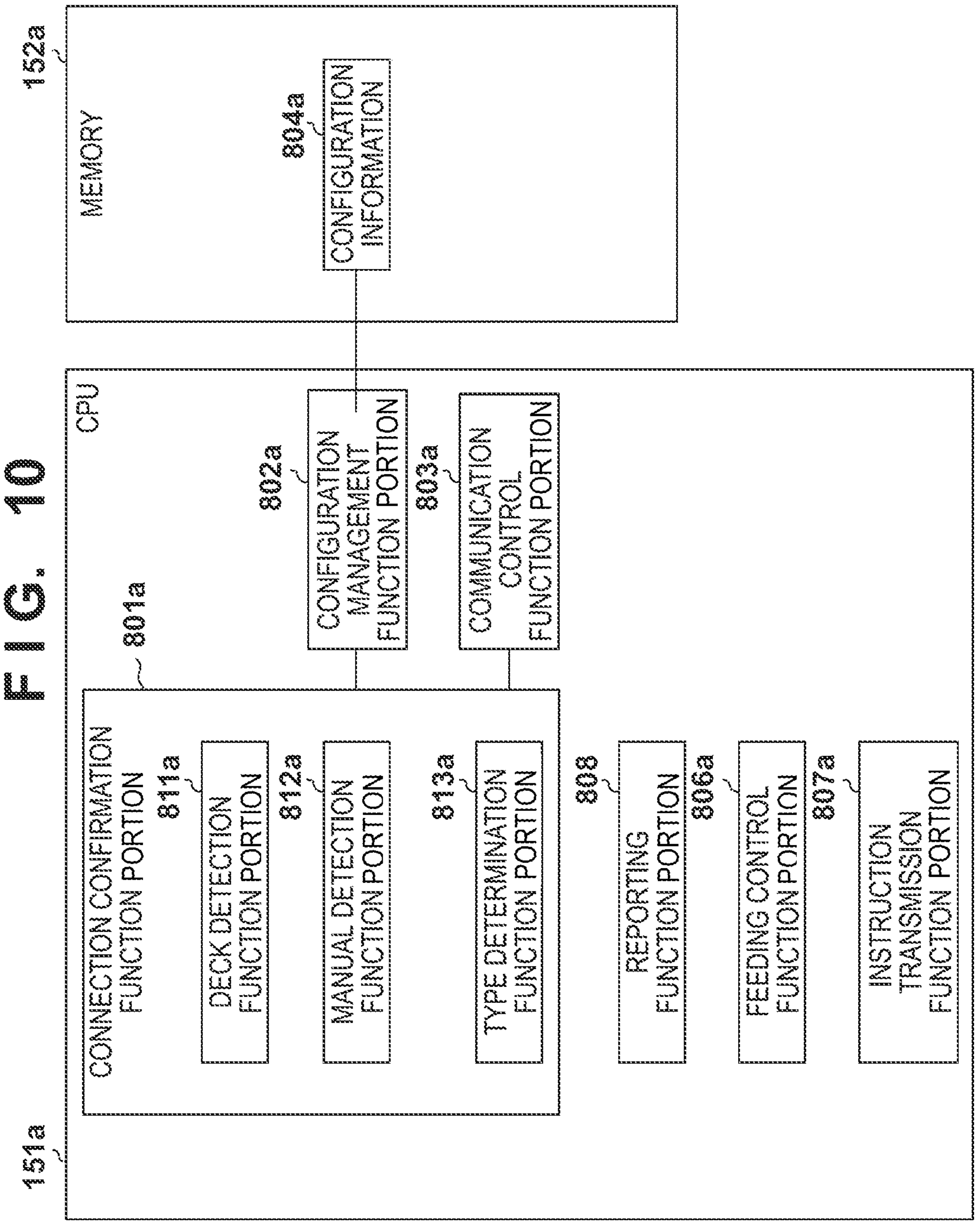
FIG. 10 is a block diagram illustrating functions of a CPU.

FIG. 9 illustrates a feeding apparatus connection confirmation executed by the CPUs 152*b* and 151*c* of the feeding deck 103. FIG. 10 illustrates functions that are realized by the CPUs 151*b* and 151*c* executing a control program. When power is supplied to the image forming system 100 from a power supply, the CPUs 151*b* and 151*c* execute the following processing. Below, to simplify the description, the CPUs 151*b* and 151*c* are described collectively as the CPU 151*b* in places. Similarly, the ASICs 154*b* and 154*c* may be described as the ASIC 154*b*. This is because the feeding decks 103*a* and 103*b* use the same or similar configuration, and execute the same or similar processing.

In step S901, the CPU 152*b* (the manual detection function portion 812*b*) detects whether or not the manual feeding unit 104 is connected to the feeding deck 103. A connection confirmation function portion 801*b* confirms whether or not the feeding apparatus is connected to the feeding decks 103*a* and 103*b*. For example, based on a switch or a sensor provided on a connecting surface 106 and the logic of the terminal, the manual detection function portion 812*b* may determine whether or not there is a connection of the manual feeding unit 104. This logic is decided by the ASIC 154*b* and outputted to the CPU 151*b*. For example, the logic is high when the manual feeding unit 104 is connected to the feeding deck 103, and the logic is low when the manual feeding unit 104 is not connected to the feeding deck 103. Alternatively, the manual detection function portion 812*b* may execute a determination based on a connection detection signal that is outputted by the manual feeding unit 104. If the manual feeding unit 104 is connected to the feeding deck 103, the CPU 151*b* advances the processing to step S902. If the manual feeding unit 104 is not connected to the feeding deck 103, the CPU 152*b* advances the processing to step S903.

In step S902, the CPU 152*b* (a configuration management function portion 802*b*) adds information illustrating that the manual feeding unit 104 is connected to the feeding deck 103 to configuration information 804*b*. The configuration information 804*b* is information for managing an existence or absence of the various feeding apparatuses configuring the feeding deck 103 and positions, and is stored in the memory 152*b*.

In step S903, the CPU 151*b* (a deck detection function portion 811*b*) determines whether or not decks such as the feeding deck 103 and the long sheet feeding deck 102 are connected to the connecting surface 106. For example, based on a switch or a sensor provided on the connecting surface 106 and the logic of the terminal, the deck detection function portion 811*b* a may determine whether or not there is a connection of the deck. Here, a deck is a feeding apparatus for which a communication establishment is necessary, such as the feeding deck 103 and the long sheet feeding deck 102. In a case where a deck is connected, the CPU 151*b* advances the processing to step S904. In a case where a deck is not connected, the CPU 152*b* finishes a connection confirmation.

In step S904, the CPU 152*b* (the communication control function portion 803*b*) establishes communication with a deck that is connected to the upstream side of the feeding deck 103, obtains configuration information of the deck, and adds the information to the configuration information 804*b*. Here, configuration information of the deck that is connected beside the feeding deck 103 may include specification information of that deck. The specification information may include information indicating a number of feeding stages and sheet sizes which the deck is provided with. As FIG. 1B illustrates, if the long sheet feeding deck 102 is connected to the feeding deck 103*a*, configuration information obtained from the long sheet feeding deck 102 includes specification information of the long sheet feeding deck 102. The presence information and specification information of the feeding apparatus present on the upstream side may be obtained by one communication, or may be obtained by a plurality of communications as follows.

In step S905, the CPU 152*b* (a type determination function portion 813*b*) determines whether or not there is a possibility that another feeding apparatus is present based on specification information obtained from the adjacent deck. The specification information includes information illustrating whether or not the adjacent deck can be connected to yet another feeding apparatus. If the deck cannot connect another feeding apparatus or is not connected to another feeding apparatus, the CPU 151*b* ends the connection confirmation. If there is a possibility that the deck is connected to another feeding apparatus, the CPU 151*b* advances the processing to step S906.

In step S906, the CPU 151*b* (the type determination function portion 813*b*) obtains this information from an adjacent deck by transmitting, to the adjacent the deck, a command to obtain information of another feeding apparatus connected to the adjacent deck.

In step S907, the CPU 152*b* (the configuration management function portion 802*b*) adds another feeding apparatus to the configuration information 804*b*. For example, the configuration management function portion 802*b* adds a connection position, specification information, or the like of another feeding apparatus to the configuration information 804*b*. In the case of FIG. 1C, information indicating that the manual feeding unit 104 and the long sheet feeding deck 102 are connected to the feeding deck 103*b* is added to the configuration information 804*b*. Also, specification information of the long sheet feeding deck 102 and the feeding deck 103*b* (for example: a number of feeding stages, a sheet size and an existence or absence of a sheet) is also added to the configuration information 804*b*.

In step S908, the CPU 152*b* (the communication control function portion 803*b*) determines whether or not there is a communication request from a downstream apparatus (for example: the image forming apparatus 101 or the feeding deck 103*a*). When the communication request is received, the CPU 151*b* advances the processing to step S909.

In step S909, the CPU 152*b* (a reporting function portion 808) transmits the configuration information 804*b* to the downstream apparatus. In the case of FIG. 1B, the reporting function portion 808 may transmit specification information or the like of the feeding deck 103 first, and then transmit specification information or the like of the long sheet feeding deck 102 and the manual feeding unit 104. In other words, when a query command from the image forming apparatus 101 is received, specification information of the long sheet feeding deck 102 and the manual feeding unit 104 may be transmitted.

In FIG. 10, a sheet feed control function portion 806*b* causes a sheet to be fed from the feeding stage that is designated by the image forming apparatus 101, and controls a conveyance of a sheet in the conveyance path. In the case of FIG. 1B, a sheet feed control function portion 806*b* controls feeding of the feeding stage in the feeding deck 103*a* and the manual feeding unit 104. An instruction transmission function portion 807*b* transmits designation information of the feeding stage and a feeding command to the feeding apparatus on an upstream side via the communication control function portion 803*b*. In the case of FIG. 1B, an instruction transmission function portion 807*b* transmits a feeding command to the long sheet feeding deck 102 via the communication control function portion 803*b*. In the case of FIG. 1C, the instruction transmission function portion 807*b* transmits a feeding command to the feeding deck 103*b* via the communication control function portion 803*b*.

Execution of a Job in the Image Forming Apparatus

Figure 11:
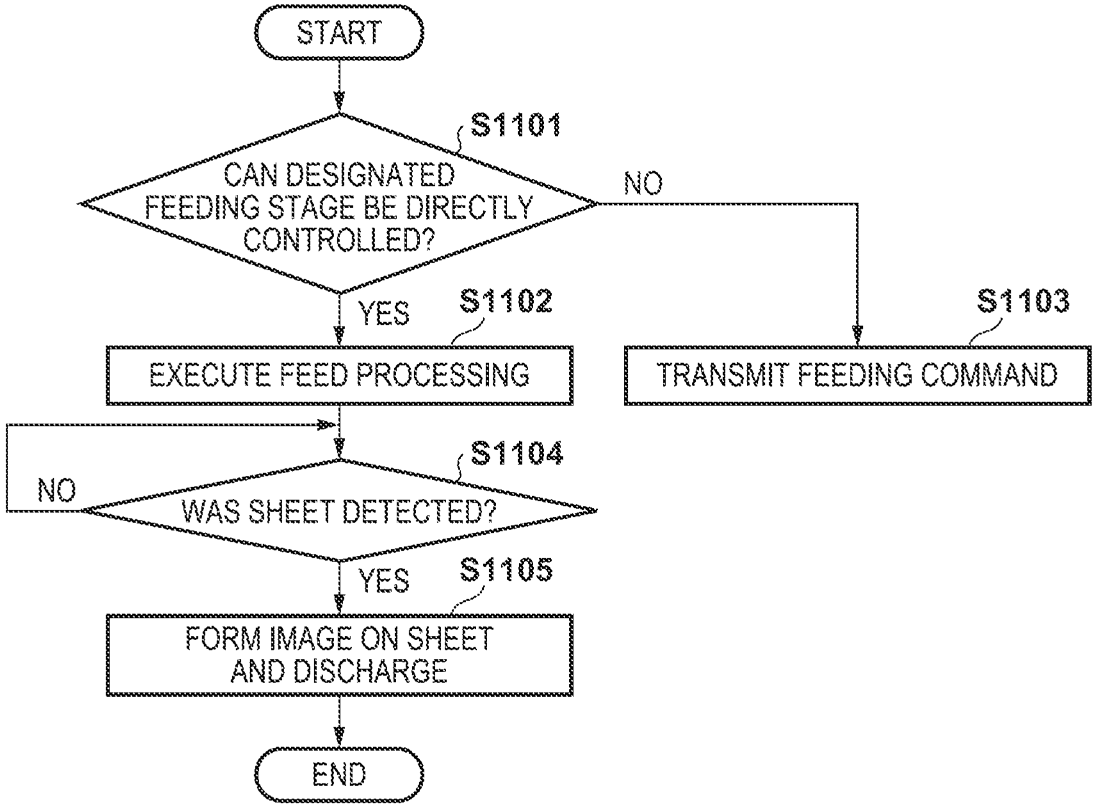
FIG. 11 is a flow chart illustrating a method for executing print jobs.

FIG. 11 illustrates a print job executed by the CPU 151*a* of the image forming apparatus 101. When a print job is inputted from the operation unit 172 or a host computer, the CPU 151*a* executes the following processing.

In step S1101, the CPU 151*a* (the job execution function portion 805*a*) analyzes the print job and determines whether or not the feeding stage designated by the print job can be directly controlled. The job execution function portion 805*a* obtains from the configuration information 804*a* information of a connection position of the designated feeding stage. Based on the obtained information, the job execution function portion 805*a* determines whether or not the designated feeding stage is a feeding apparatus which is connected to the image forming apparatus 101 directly or a feeding stage existing within the image forming apparatus 101. A feeding apparatus connected directly is a feeding apparatus that is attached to the mounting surface 105 (for example: the manual feeding unit 104, the long sheet feeding deck 102, and the feeding deck 103*a*). In other words, the CPU 151*a* can control these feeding apparatus directly. On the other hand, the CPU 151*a* cannot directly control the manual feeding unit 104 and the long sheet feeding deck 102 when they are connected to the feeding decks 103*a* and 103*b*. The configuration information 804*a* includes the presence or absence of a connection, a connection position, a number of feeding stages, or the like, of a feeding apparatus such as the feeding deck 103, the manual feeding unit 104, and the long sheet feeding deck 102. Therefore, the CPU 151*a* may determine whether or not it is possible to control the designated feeding stage directly by referring the configuration information 804*a*. In this way, in order to feed a sheet from the manual feeding unit 104 and the long sheet feeding deck 102 when they are connected to the feeding deck 103, it is necessary for the CPU 151*a* to transmit a feeding command to the feeding deck 103. Consequently, viewed from the CPU 151*a*, the manual feeding unit 104 and the long sheet feeding deck 102, when connected to the feeding deck 103, are feeding stages controlled indirectly. If it is possible to control the designated feeding stage directly, the CPU 151*a* advances the processing to step S1102. If it is not possible to control the designated feeding stage directly, the CPU 151*a* advances the processing to step S1103.

In step S1102, the CPU 151*a* (the sheet feed control function portion 806*a*) executes feed processing by driving the feeding roller 12 of the designated feeding stage. The CPU 151*a* supplies a driving signal to the manual feeding unit 104 connected to the image forming apparatus 101. Also, the CPU 151*a* transmits a feeding command to the long sheet feeding deck 102 and the feeding deck 103*a* connected to the image forming apparatus 101. In step S1103, the CPU 151*a* (the instruction transmission function portion 807*a*) transmits a feeding command accompanied by information indicating the designated feeding stage to an upstream deck (for example: the feeding deck 103*a*).

In step S1104, the CPU 151*a* (the sheet feed control function portion 806*a*) determines whether or not the sheet sensor 11 of the image forming apparatus 101 detects the sheet P. If the sheet P is detected, the CPU 151*a* advances the processing to step S1105. In step S1105, the CPU 151*a* (the job execution function portion 805*a*) controls the imaging forming unit 15 to form an image on the sheet P and discharge the sheet P from the image forming apparatus 101.

Feed Processing in the Feeding Deck

Figure 12:
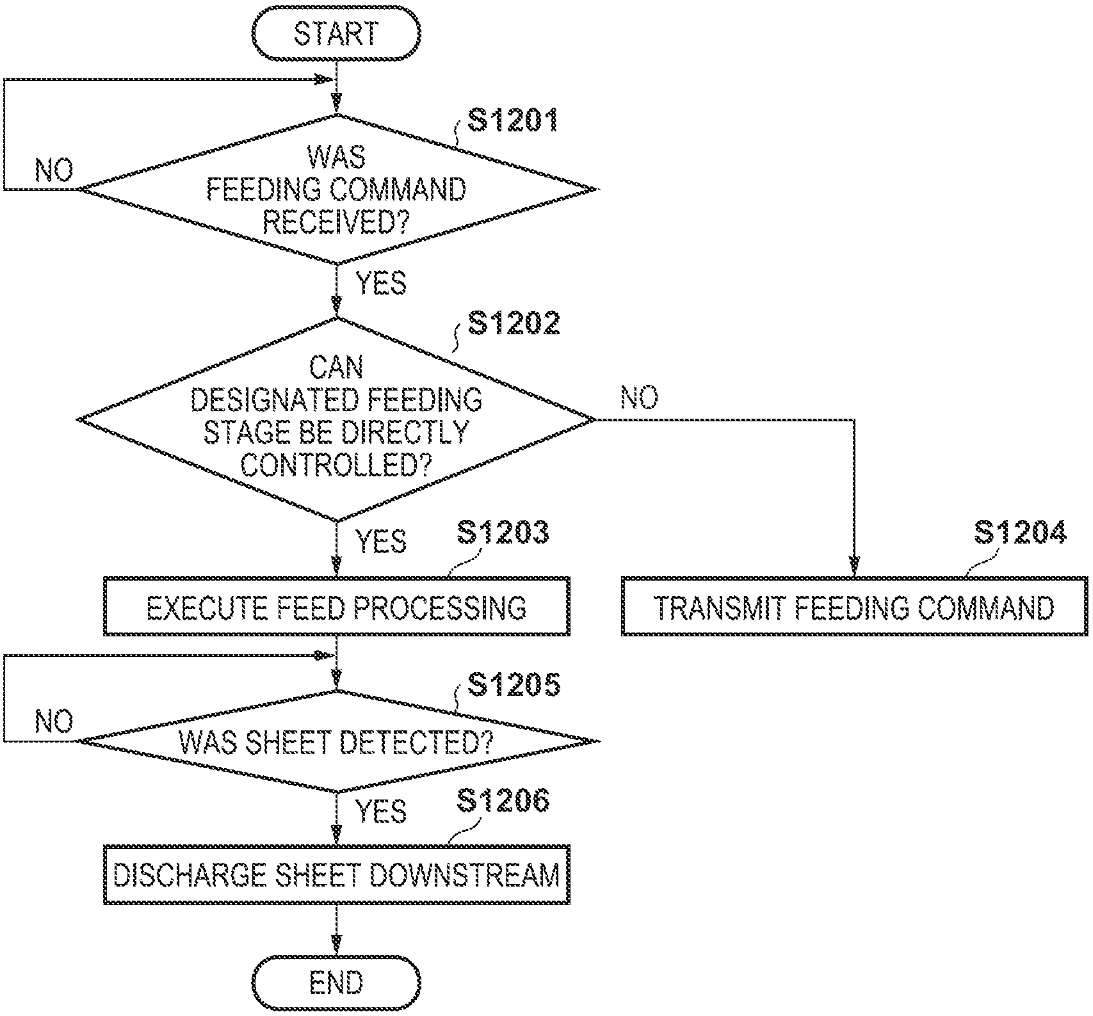
FIG. 12 is a flow chart illustrating sheet feed control in a feeding deck.

FIG. 12 illustrates feed processing executed by the CPUs 151*b* and 151*c* of the feeding deck 103. Here, too, the CPUs 151*b* and 151*c* are represented by the CPU 152*b* collectively, and the ASICs 154*b* and 154*c* are represented by the ASIC 154*b*.

In step S1201, the CPU 151*b* (the communication control function portion 803*b*) determines whether or not a feeding command is received from the downstream apparatus. When a feeding command is received, the CPU 151*b* advances the processing to step S1202.

In step S1202, the CPU 151*b* (the sheet feed control function portion 806*b*) determines whether or not it is possible to control the feeding stage which is designated by feeding command directly. The sheet feed control function portion 806*b* obtains from the configuration information 804*b* information of a connection position of the designated feeding stage. Based on obtained information, the sheet feed control function portion 806*b* determines whether or not the designated feeding stage is the manual feeding unit 104 when it has been connected to the feeding deck 103 or a feeding stage present in the feeding deck 103. Note, for the long sheet feeding deck 102 and the feeding deck 103*b*, a feeding command must be transmitted, but the feeding apparatus can be controlled directly by the CPU 151*b*. The feeding deck 103*a* can indirectly control the manual feeding unit 104 when it is connected to the feeding deck 103*b*. Note that the feeding deck 103*b* can directly control the manual feeding unit 104 when it is connected to the feeding deck 103*b*. If it is possible to control the designated feeding stage directly, the CPU 151*b* advances the processing to step S1203. If it is not possible to control the designated feeding stage directly, the CPU 152*b* advances the processing to step S1204.

In step S1203, the CPU 151*b* (the sheet feed control function portion 806*b*) executes feed processing by driving the feeding roller 12 of the designated feeding stage. For example, the sheet feed control function portion 806*b* commands the ASIC 154*b* so as to drive the motor 161 of the manual feeding unit 104. The ASIC 154*b* drives the motor 161 of the manual feeding unit 104 in accordance with the command. Also, the feeding deck 103*a* transmits a feeding command received from the image forming apparatus 101 to a separate feeding deck 103*b* or the long sheet feeding deck 102 connected to the feeding deck 103*a*. In the case of FIG. 1B, the feeding deck 103*a* transmits the feeding command to the long sheet feeding deck 102. In the case of FIG. 1C, the feeding deck 103*a* transfers the feeding command to the feeding deck 103*b*.

In step S1204, the CPU 151*b* (the instruction transmission function portion 807*b*) transmits a feeding command accompanied by information indicating the designated feeding stage to an upstream deck. In the case of FIG. 1C, the feeding deck 103*a* transmits the feeding command to the feeding deck 103*b*. The feeding command is a command for causing the manual feeding unit 104 or the long sheet feeding deck 102 connected to the feeding deck 103*b* to execute feeding.

In step S1205, the CPU 151*b* (the sheet feed control function portion 806*b*) determines whether or not the sheet sensor 11 of the feeding deck 103 detects the sheet P. If the sheet P is detected, the CPU 151*b* advances the processing to step S1206. In step S1206, the CPU 151*b* (the sheet feed control function portion 806*b*) controls the conveyance roller 13 to discharge the sheet P to the downstream apparatus (e.g.: the image forming apparatus 101).

By virtue of the first embodiment, the cable 17 need only be connected between two adjacent devices. For this reason, it is possible for the length of the cable 17 to be short.

Second Embodiment

The image forming apparatus 101, the feeding deck 103, and the long sheet feeding deck 102 in the first embodiment can only directly communicate with apparatuses that are connected respectively adjacent thereto. On the other hand, in the second embodiment, the image forming apparatus 101 and the feeding deck 103*b* can communicate directly by the image forming apparatus 101 and the feeding decks 103*a* and 103*b* being bus-connected. For example, the image forming apparatus 101 is configured such that configuration information of the feeding deck 103*b* can be obtained without help of the feeding deck 103*a*. Accordingly, the image forming apparatus 101 can directly control the feeding deck 103*b*. However, the image forming apparatus 101 or the feeding deck 103 can still only directly control the long sheet feeding deck 102 when directly connected to the long sheet feeding deck 102. This is because the long sheet feeding deck 102 does not have a communication circuit supporting a bus connection.

[Connection Configuration]

Figure 13:
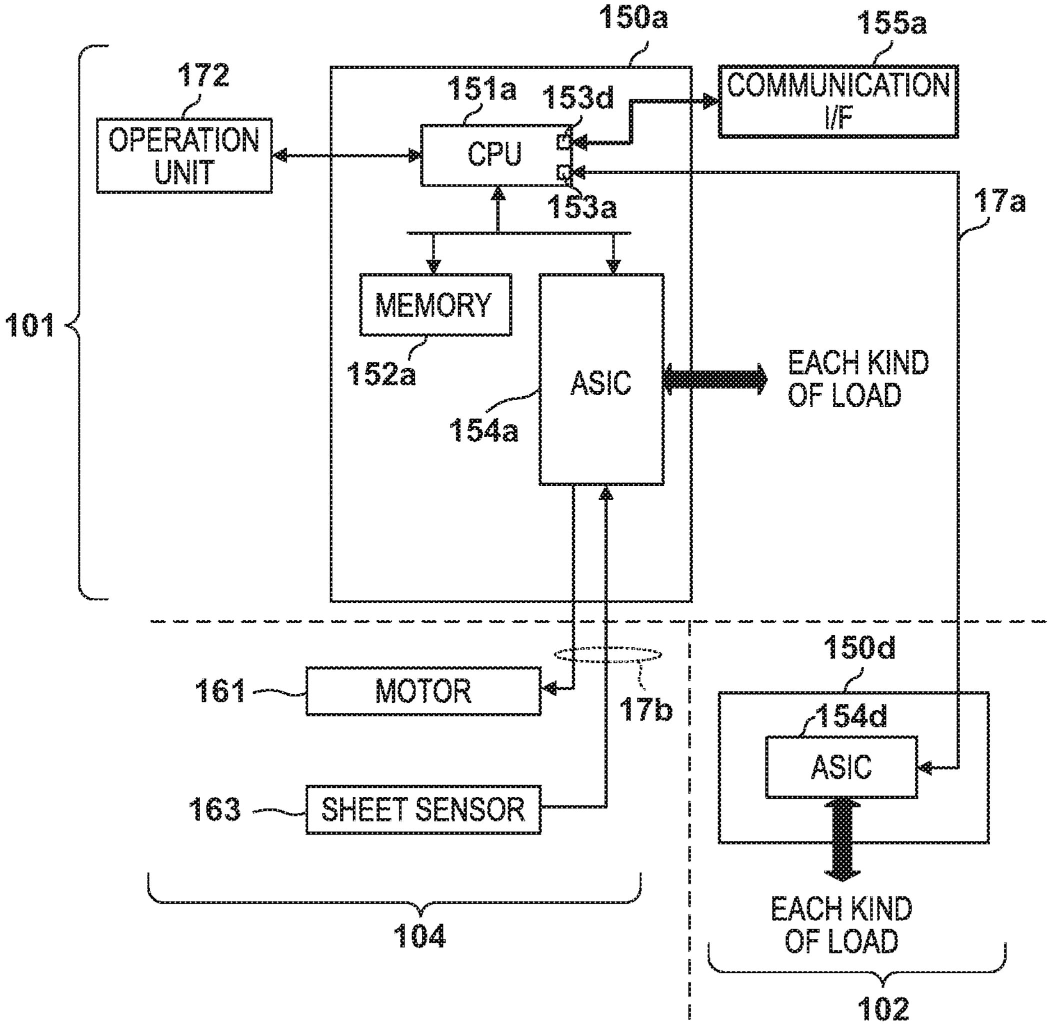
FIG. 13 is a view illustrating controllers of the image forming system.

FIG. 13 illustrates the image forming system 100 including the image forming apparatus 101, the long sheet feeding deck 102, and the manual feeding unit 104. FIG. 13 differs from FIG. 4 in that the image forming apparatus 101 has a communication I/F 155*a*. The communication I/F 155*a* may be arranged in the control unit 150*a*. The CPU 151*a* is connected to the communication I/F 155*a* via an I/O port 153*d*. The communication I/F 155*a* executes serial communication via a serial bus 20 arranged within the cable 17*a*. However, in the connection configuration that FIG. 13 illustrates, the communication I/F 155*a* does not execute communication because the feeding deck 103 is not connected to the image forming apparatus 101.

Figure 14:
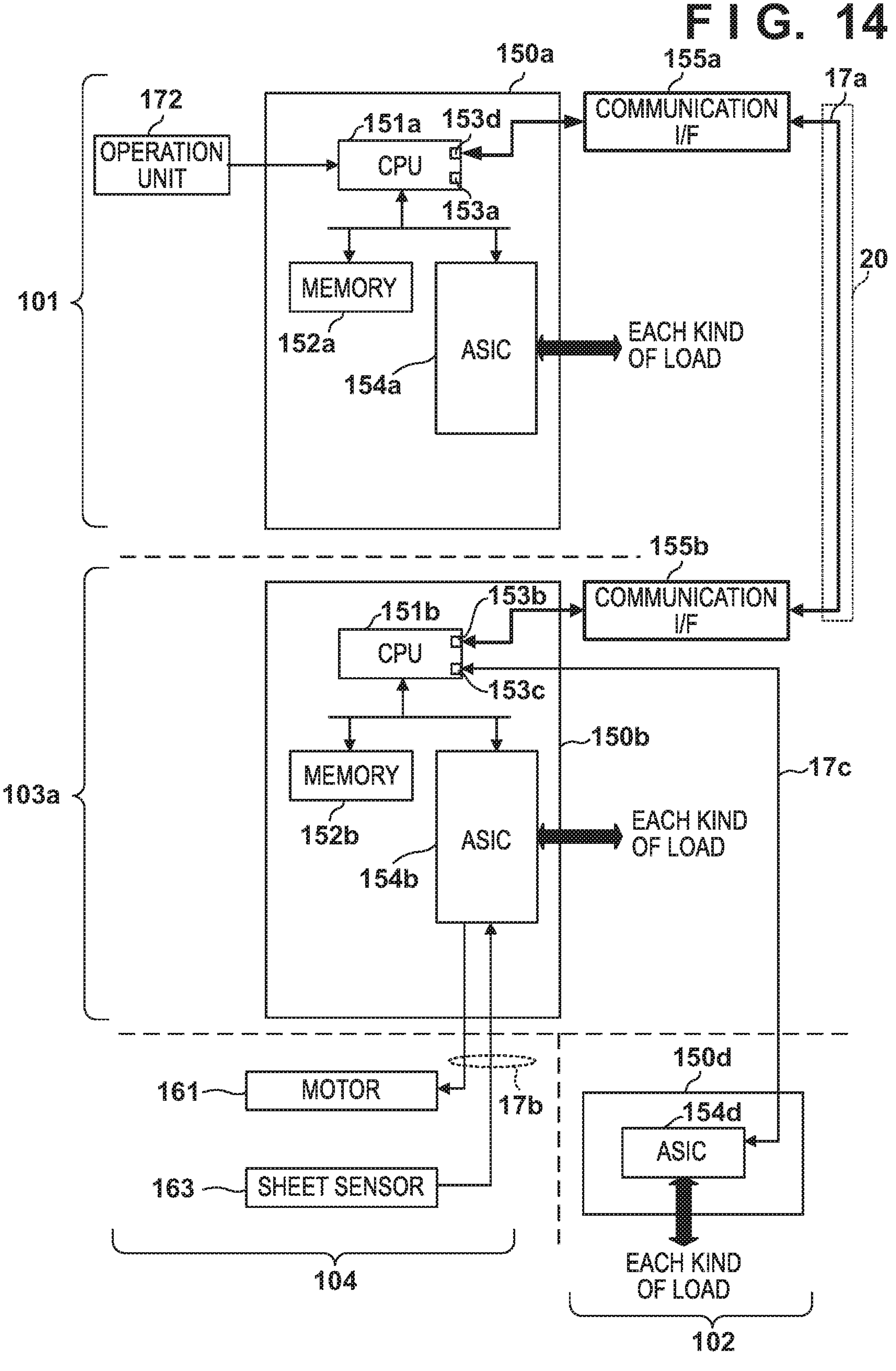
FIG. 14 is a view illustrating controllers of the image forming system.

FIG. 14 illustrates the image forming system 100 including the image forming apparatus 101, the feeding deck 103*a*, the long sheet feeding deck 102, and the manual feeding unit 104. FIG. 14 differs from FIG. 5 in that the image forming apparatus 101 includes the communication I/F 155*a*, and the feeding deck 103*a* also includes a communication I/F 155*b*. The communication I/F 155*a* and the communication I/F 155*b* execute serial communication via the serial bus 20 arranged within the cable 17*a*. The communication I/F 155*b* may be arranged in the control unit 150*b*. The connection configuration is the only difference between FIG. 14 and FIG. 5, and the basic processing flow is the same as the processing flow in the connection of the first embodiment.

Figure 15:
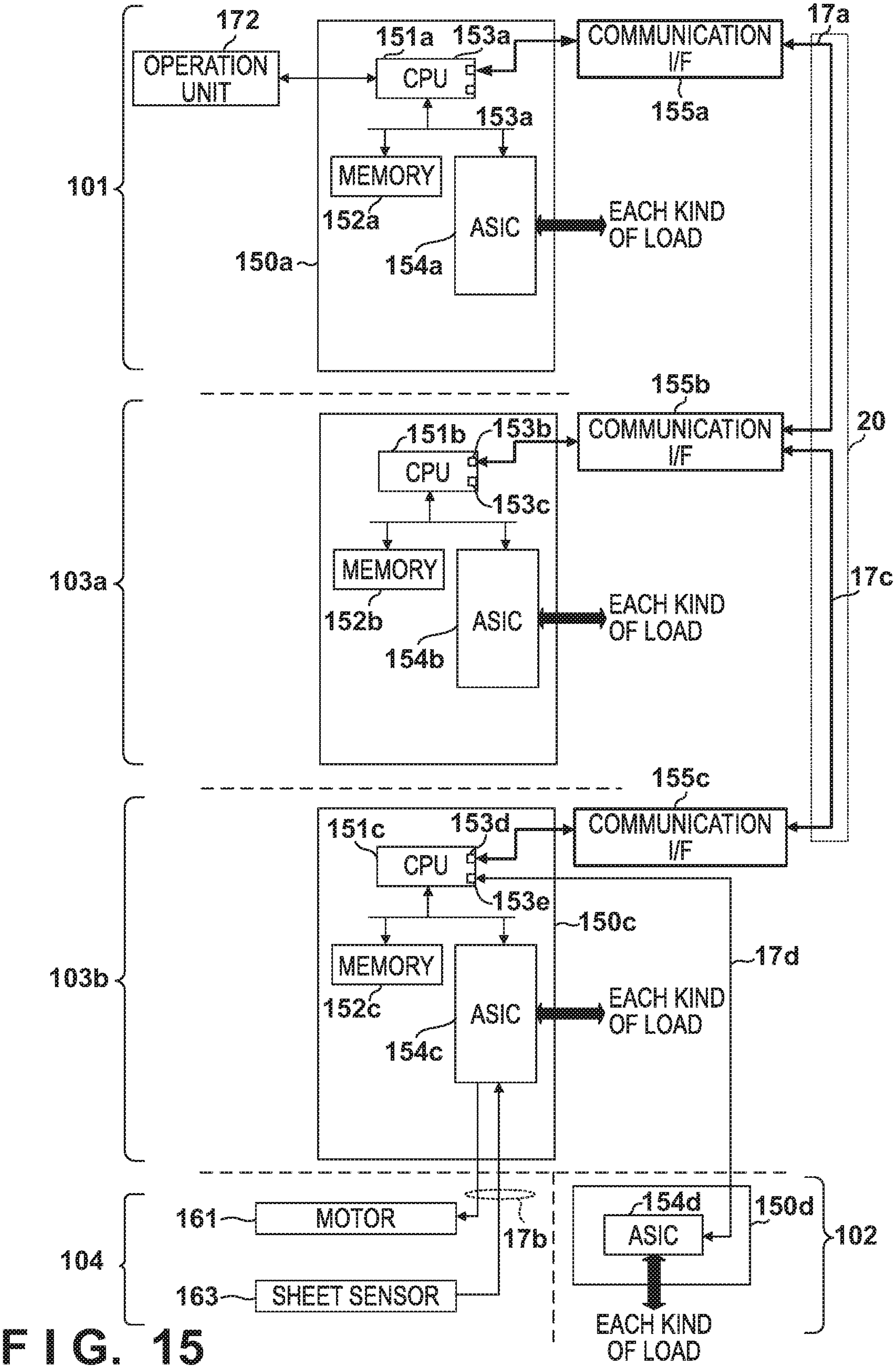
FIG. 15 is a view illustrating controllers of the image forming system.

FIG. 15 illustrates the image forming system 100 including the image forming apparatus 101, the feeding deck 103*a*, the feeding deck 103*b*, the long sheet feeding deck 102, and the manual feeding unit 104. FIG. 15 differs from FIG. 6 in that the image forming apparatus 101 includes the communication I/F 155*a*, the feeding deck 103*a* includes the communication I/F 155*b*, and the feeding deck 103*b* includes a communication I/F 155*c*. The communication I/F 155*b* of the communication I/F 155*a* and the feeding deck 103*a* execute serial communication via the serial bus 20 arranged in the cable 17*a*. The communication I/F 155*a* and the communication I/F 155*c* of the feeding deck 103*b* execute serial communication via the serial bus 20 arranged in the cables 17*a* and 17*c*. In other words, the communication I/F 155*a* and the communication I/F 155*c* of the feeding deck 103*b* can communicate directly. The communication I/F 155*c* of the feeding deck 103*b* may be arranged in the control unit 150*c* of the feeding deck 103*b*.

In the connection configuration that FIG. 6 illustrates, the feeding deck 103*a* must transfer feeding commands addressed to the feeding deck 103*b* to the feeding deck 103*b*. However, in the connection configuration that FIG. 15 illustrates, a feeding command addressed to the feeding deck 103*b* is directly transmitted from the image forming apparatus 101 to the feeding deck 103*b*.

As is widely known, in serial communication via the serial bus 20, the master communication I/F 155*a* assigns a communication ID to each of the slave communication I/Fs 155*b* and 155*c*. The communication I/F 155*a* transmits to the serial bus a command which sets the self-communication ID and the destination communication ID. Although the communication I/Fs 155*b* and 155*c* pass commands in which a communication ID assigned to self is set on to the CPUs 151*b* and 151*c*, they ignore all other commands. The communication ID of the transmission source and the communication ID of the destination are also set in a response to the command.

Processing Executed by the Control Unit of the Image Forming Apparatus

Figure 16:
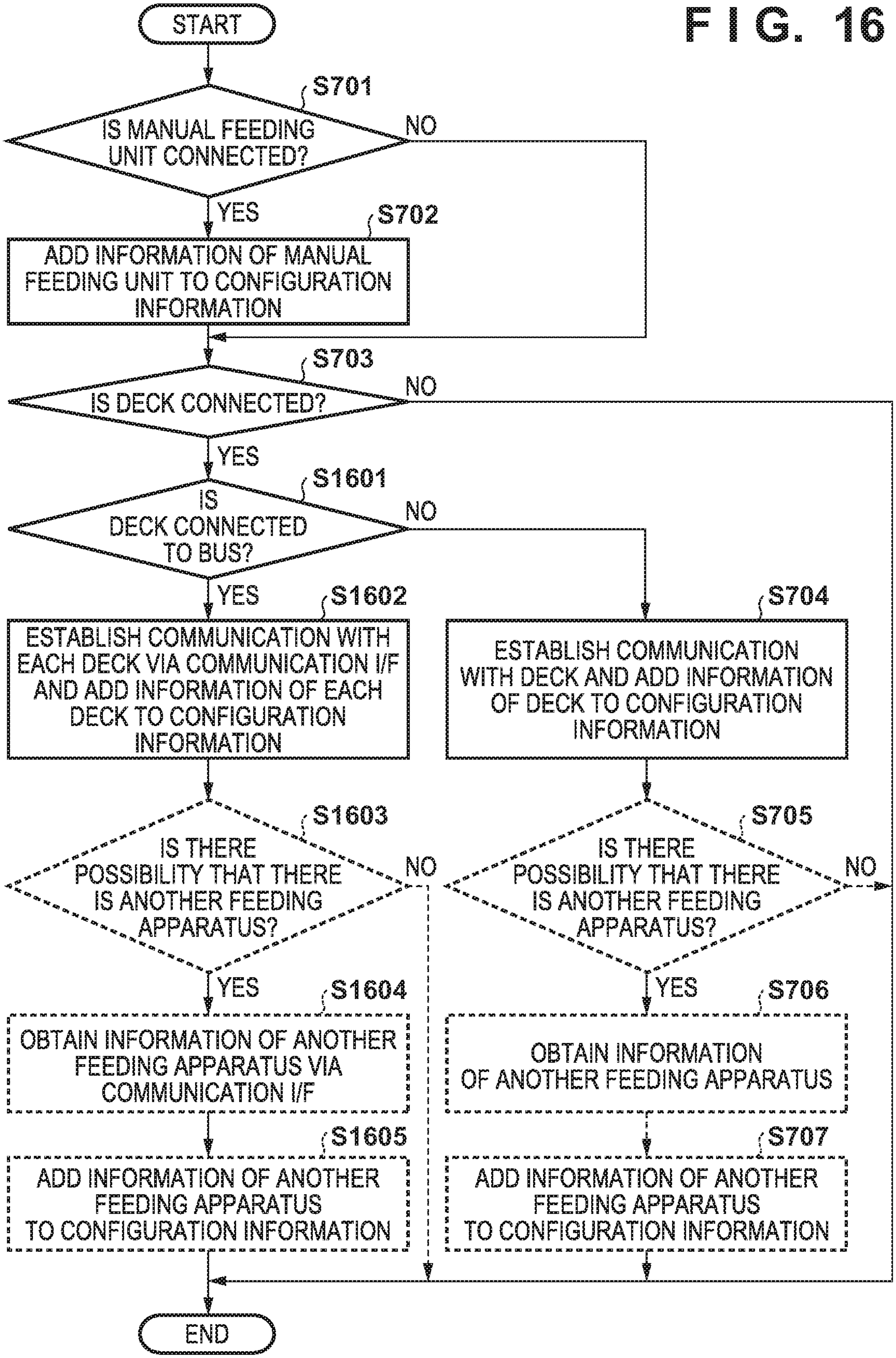
FIG. 16 is a flow chart illustrating a feeding apparatus connection confirmation.

FIG. 16 illustrates a feeding apparatus connection confirmation executed by the CPU 151*a* of the image forming apparatus 101. Steps that have already been described are given the same reference numerals, and descriptions thereof are omitted. In a case where a deck is connected to the image forming apparatus 101 in step S703, the CPU 151*a* advances the processing to step S1601.

In step S1601, the CPU 151*a* (the connection confirmation function portion 801*a*) determines whether or not the feeding deck 103 is connected to the serial bus 20. The communication I/F 155*a* searches for another communication I/F 155*b* via the serial bus 20 and allocates communication IDs to the communication I/Fs 155*b* and 155*c* connected to the serial bus 20. The communication I/Fs 155*b* and 155*c* reserve each unique communication ID by transmitting a response in order from the communication I/F closest to the communication I/F 155*a*. The communication I/F 155*a* has a list of the communication I/Fs 155*b* and 155*c* for which allocation of a communication ID succeeded. This list can be referred to by the connection confirmation function portion 801*a*. The connection confirmation function portion 801*a* determines that the feeding deck 103 is not connected to the serial bus 20 if the communication I/Fs 155*b* and 155*c* are not registered in the list. The connection confirmation function portion 801*a* determines that the feeding deck 103 is connected to the serial bus 20 if the communication I/Fs 155*b* and 155*c* are not registered in the list. The connection confirmation function portion 801*a* recognizes the number of feeding decks 103 from the number of the communication I/Fs 155*b* and 155*c* registered in the list. If the feeding deck 103 is not connected to the serial bus 20, the CPU 151*a* advances the processing to step S704. If the feeding deck 103 is not connected to the serial bus 20, the CPU 151*a* advances the processing to step S1602.

In step S1602, the CPU 151*a* (the communication control function portion 803*a*) establishes communication in order with each feeding deck 103 connected to the serial bus 20, obtains configuration information of each feeding deck 103, and adds this information to the configuration information 804*a*.

In step S1603, the CPU 151*a* (the type determination function portion 813*a*) determines whether or not there is a possibility that another feeding apparatus is present based on specification information obtained from the feeding deck 103. Information indicating whether the feeding deck 103 can be connected to another feeding apparatus (the manual feeding unit 104 and the long sheet feeding deck 102) may be included in the specification information. If the deck cannot connect another feeding apparatus or is the feeding deck 103 when it is not connected to another feeding apparatus, the CPU 151*a* ends the connection confirmation. In the case of the feeding deck 103 when there is a possibility that another feeding apparatus is connected, the CPU 151*a* advances the processing to step S1604.

In step S1604, the CPU 151*a* (the type determination function portion 813*a*), by transmitting a command for obtaining information of other feeding apparatuses connected to the respective feeding decks 103 to the respective feeding decks 103, obtains the information from the respective feeding decks 103.

In step S1605, the CPU 151*a* (the configuration management function portion 802*a*) adds another feeding apparatus to the configuration information 804*a*. For example, the configuration management function portion 802*a* adds a connection position, specification information, or the like of another feeding apparatus to the configuration information 804*a*. In the case of FIG. 1B, information indicating that the manual feeding unit 104 and the long sheet feeding deck 102 are connected to the feeding deck 103*a* is added to the configuration information 804*a*. In the case of FIG. 1C, information indicating that the feeding deck 103*b* is connected to the feeding deck 103*a* and the manual feeding unit 104 and the long sheet feeding deck 102 are connected to the feeding deck 103*b* is added to the configuration information 804*a*. Also, specification information of the long sheet feeding deck 102 and the feeding deck 103*b* (a number of feeding stages, a sheet size and an existence or absence of a sheet) is also added to the configuration information 804*a*.

Processing Executed by the Control Unit of the Feeding Deck

Figure 17:
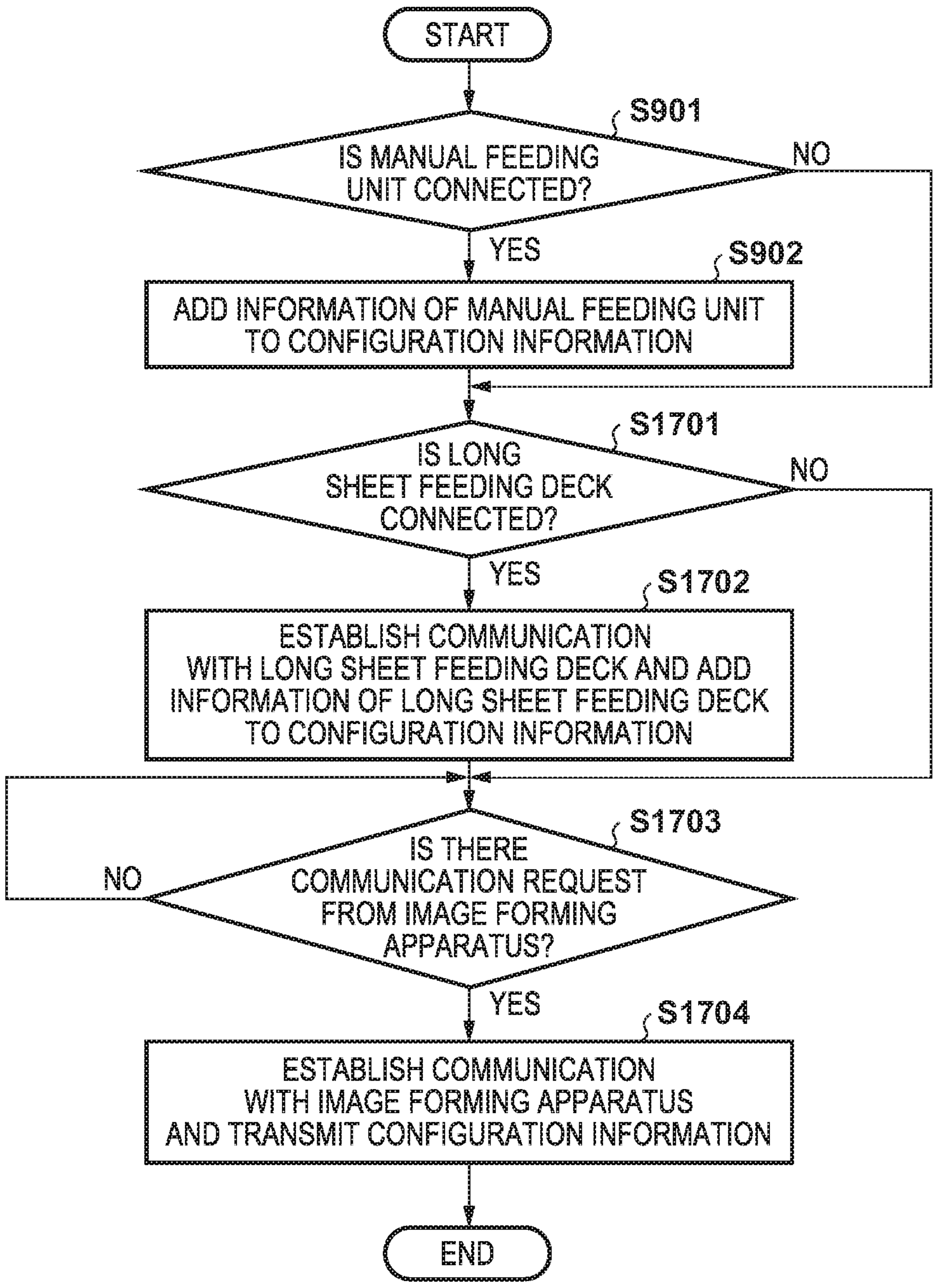
FIG. 17 is a flow chart illustrating a feeding apparatus connection confirmation.

FIG. 17 illustrates a feeding apparatus connection confirmation executed by the CPUs 151*b* and 151*c* of the feeding deck 103. Hereinafter, the CPUs 151*b* and 151*c* are collectively referred to as a CPU 151*b*. Steps that have already been described are given the same reference numerals, and descriptions thereof are omitted. When step S902 finishes, the CPU 151*b* advances the processing to step S1701.

In step S1701, the CPU 152*b* (the deck detection function portion 811*b*) determines whether or not the long sheet feeding deck 102 is connected to the connecting surface 106. In a case where the long sheet feeding deck 102 is connected, the CPU 151*b* advances the processing to step S1702. In a case where the long sheet feeding deck 102 is not connected, the CPU 151*b* advances the processing to step S1703.

In step S1702, the CPU 151*b* (the communication control function portion 803*b*) establishes communication with the long sheet feeding deck 102 via a serial line, obtains configuration information of the long sheet feeding deck 102, and adds this information to the configuration information 804*b*. In step S1703, the CPU 152*b* (the communication control function portion 803*b*) determines whether or not a communication request was received via the serial bus 20 from the image forming apparatus 101. If a communication request was received, the CPU 151*b* advances the processing to step S1704.

In step S1704, the CPU 151*b* (the reporting function portion 808) transmits the configuration information 804*b* to the image forming apparatus 101 via the serial bus 20. In the case of FIG. 1B and FIG. 1C, the reporting function portion 808 of the feeding deck 103*a* transmits the specification information and the like of the feeding deck 103*a*. In the case of FIG. 1C, the reporting function portion 808 of the feeding deck 103*b* initially transmits specification information and the like of the feeding deck 103*b*, and then may transmit specification information and the like of the long sheet feeding deck 102 or the manual feeding unit 104. In other words, when a query command from the image forming apparatus 101 is received, specification information of the long sheet feeding deck 102 and the manual feeding unit 104 may be transmitted.

Execution of a Job in the Image Forming Apparatus

The CPU 151*a* (the instruction transmission function portion 807*a*) in step S1103 of FIG. 11 transmits a feeding command to the feeding deck 103 having a designated feeding stage or to the feeding deck 103 that directly can control the designated feeding stage. For example, the instruction transmission function portion 807*a* refers to configuration information 804*a*, and identifies a feeding deck 103 having a designated feeding stage or a feeding deck 103 that directly can control the designated feeding stage. Furthermore, the instruction transmission function portion 807*a* transmits a feeding command to the identified feeding deck 103 via the serial bus 20. In the feeding command, information indicating the designated feeding stage is attached. Other points are as already described above.

Feed Processing in the Feeding Deck

Figure 18:
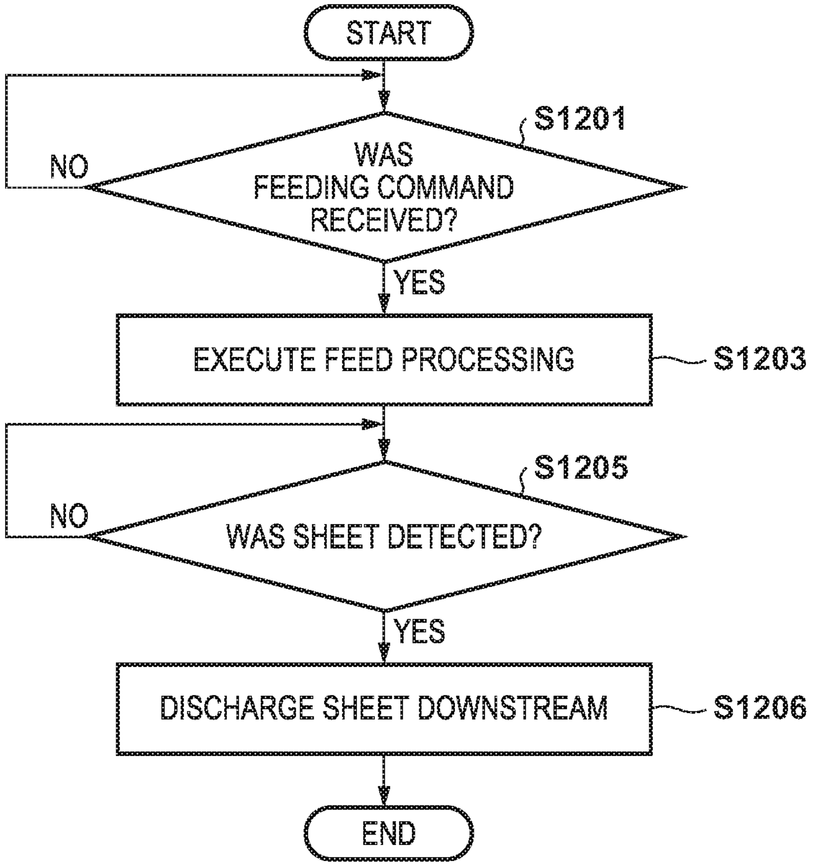
FIG. 18 is a flow chart illustrating sheet feed control in a feeding deck.

FIG. 18 illustrates feed processing executed by the CPUs 151*b* and 151*c* of the feeding deck 103. Hereinafter, the CPUs 152*b* and 151*c* are collectively referred to as a CPU 151*b*. In FIG. 18, step S1202 and step S1204 illustrated in FIG. 12 do not exist. This is because a feeding command is directly transmitted to each feeding deck 103 via the serial bus 20, and there is no transferring of the feeding command. In the case of FIG. 1C, the feeding deck 103*b* directly receives the feeding command from the image forming apparatus 101. The feeding deck 103*b* feeds a sheet from its own feeding stage 111, the long sheet feeding deck 102 or the manual feeding unit 104 in accordance with a feeding command.

By virtue of the second embodiment, the cable 17 need only be connected between an apparatus and the apparatus positioned beside it. For this reason, it is possible for the length of the cable 17 to be short.

<Technical Ideas Derived From the Examples>

As illustrated in FIG. 1 or the like, the image forming system 100 having the image forming apparatus 101, and one or more feeding apparatus (for example: a feeding deck) that is connected in series to the image forming apparatus 101 and feeds the sheet P to the image forming apparatus 101 is provided. The image forming apparatus 101 has the mounting surface 105 to which one feeding apparatus among one or more feeding apparatus is connected. The mounting surface 105 is an example of a first mounting surface to which a feeding apparatus of a first type or a feeding apparatus of a second type can connect. The terminal 21*a* is an example of a first signal terminal that outputs a control signal from the image forming apparatus 101 to a feeding apparatus of a first type when the feeding apparatus of the first type (for example: the manual feeding unit 104), which is to be directly attached to the image forming apparatus 101, is connected to the mounting surface 105. Also, the terminal 21*a* is an example of a first signal terminal for outputting a control signal from the image forming apparatus to a feeding apparatus of a first type in a case where the feeding apparatus of the first type is connected to the first mounting surface. The terminal 22*a* is an example of a second signal terminal for communicating a signal with a feeding apparatus of a second type when the feeding apparatus of the second type (for example: the feeding deck 103) connected between the image forming apparatus 101 and a feeding apparatus of the first type is connected to the mounting surface 105. The terminal 22*a* is an example of a second signal terminal for communicating a signal with a feeding apparatus of the second type in a case where the feeding apparatus of the second type is connected to the first mounting surface. The inlet 18*a* is an example of an acceptance port that accepts the sheet P fed from one or more feeding apparatus. The inlet 18*a* is an example of an acceptance port that accepts the sheet P fed from a feeding apparatus of the first type or of the second type. The control unit 150*a* functions as a control unit (at least one first processor) for generating a control signal which is outputted to the first signal terminal or the second signal terminal.

The feeding deck 103 is an example of a feeding apparatus of the second type. The feeding deck 103 may have a second mounting surface to which a feeding apparatus of the first type can connect. The terminal 25*b* is an example of a third signal terminal which is to be connected to the second signal terminal via a first cable (for example: the cable 17*a*). The terminal 21*b* is an example of a fourth signal terminal which outputs a control signal to a feeding apparatus of the first type in a case where the feeding apparatus of the first type is connected to the image forming apparatus via a feeding apparatus of the second type. The terminal 21*b* is an example of a fourth signal terminal which outputs a control signal to a feeding apparatus of the first type in a case where the feeding apparatus of the first type is connected to the second mounting surface of a feeding apparatus of the second type.

The feeding apparatus of the first type may have a fifth signal terminal (for example: the terminal 24). The fifth signal terminal is connected to the first signal terminal of the image forming apparatus via a second cable (for example: the cable 17*b*) in a case where a feeding apparatus of the first type is connected to the mounting surface 105. The fifth signal terminal is connected to the fourth signal terminal (for example: the terminal 21*b*) of the feeding apparatus of the second type via a second cable in a case where the feeding apparatus of the first type is connected to the image forming apparatus via the feeding apparatus of the second type. In a case where the feeding apparatus of the first type is connected to the image forming apparatus via the feeding apparatus of the second type, the feeding apparatus of the first type is connected to the second mounting surface of the feeding apparatus of the second type.

The control unit 150*a* outputs a control signal to the feeding apparatus of the first type via the first signal terminal in a case where the feeding apparatus of the first type is connected to the mounting surface 105. The control unit 150*a* outputs a control command for controlling the feeding apparatus of the first type to the feeding apparatus of the second type via the second signal terminal in a case where the feeding apparatus of the first type is connected to the feeding apparatus of the second type. The feeding apparatus of the second type outputs a control signal based on a control command for controlling the feeding apparatus of the first type outputted from the image forming apparatus to the feeding apparatus of the first type via the fourth signal terminal in a case where the feeding apparatus of the first type is connected to the image forming apparatus via the feeding apparatus of the second type. In this way, in a case where the feeding apparatus of the first type is connected to the image forming apparatus via the feeding apparatus of the second type, a cable which directly connects the feeding apparatus of the first type and the image forming apparatus is not necessary, and so a cable length is shorter. Accordingly, usability in an image forming system in which a plurality of feeding apparatuses are connected is improved.

The feeding apparatus of the second type (for example: the feeding deck 103) may have a conversion unit or at least one second processor (for example: the control unit 150*b*) for converting a control command for controlling the feeding apparatus of the first type received from the image forming apparatus into a control signal (for example: a driving current and a driving pulse) which the feeding apparatus of the first type can receive. The conversion unit or the at least one second processor outputs the control signal from the fourth signal terminal to the feeding apparatus of the first type. Thereby, the feeding apparatus of the first type can be connected to the image forming apparatus and also the feeding apparatus of the second type.

Based on a voltage or a current or signal applied to the first signal terminal or the second signal terminal, the connection confirmation function portion 801*a* may function as a discrimination section (at least one first processor) that discriminates a type of a feeding apparatus connected to the mounting surface 105. In this signal, the configuration information 804*b* obtained from the feeding apparatus connected to the mounting surface 105 may be included. The control unit 150*a* may recognize whether the feeding apparatus of the first type or the feeding apparatus of the second type is connected to the mounting surface 105 based on the result of discrimination of the discrimination section. By this, the control unit 150*b* makes it possible to recognize the type of the feeding section connected to the upstream side.

In a case where the feeding apparatus of the second type is connected to the first mounting surface, the control unit 150*a* may transmit a query signal for querying whether the feeding apparatus of the first type is connected to the feeding apparatus of the second type. A query signal is transmitted to the feeding apparatus of the second type via the second signal terminal. The control unit 150*a* receives a response signal with respect to the query signal from the feeding apparatus of the second type. Furthermore, the control unit 150*a* recognizes that the feeding apparatus of the first type is connected to the second mounting surface of the feeding apparatus of the second type based on the response signal. In this way, the control unit 150*b*, via a feeding apparatus such as the feeding deck 103 or the like, may recognize still another feeding apparatus. By this, the control unit 150*b* can recognize the feeding apparatus connected to the upstream side.

The image forming apparatus 101 controls the manual feeding unit 104 or the long sheet feeding deck 102 connected to the most upstream feeding deck 103 by the feeding deck 103 connected most upstream (final position) from among a plurality of serially connected feeding decks 103. In this way, a cable through which the manual feeding unit 104 or the long sheet feeding deck 102 is directly connected to the image forming apparatus is made unnecessary by the controlling of the manual feeding unit 104 or the long sheet feeding deck 102 by the feeding deck 103 connected most upstream. Accordingly, usability in an image forming system whose plurality of feeding apparatuses is connected is corrected.

The connection confirmation function portion 801*a* functions as a determination section (the at least one first processor) which determines whether the feeding stage designated by the print job is the manual feeding unit or the long sheet feeding deck connected to the feeding deck connected most upstream. In a case where the feeding stage is the manual feeding unit or the long sheet feeding deck connected to the feeding deck connected most upstream, the instruction transmission function portion 807*a* functions as a transmission section which transmits a control command, (control signal) for controlling operation of the manual feeding unit or the long sheet feeding deck, to the feeding deck connected most upstream. Note, the control command may be conveyed or transferred via each feeding deck 103 present between the image forming apparatus and the manual feeding unit or the long sheet feeding deck. In other words, a transfer method such as in the first embodiment may be employed and a conveyance method such as in the second embodiment may be employed. By this, the image forming apparatus 101 can control the manual feeding unit or the long sheet feeding deck.

As described in the second embodiment, the image forming apparatus 101 may establish communication with each of the plurality of the feeding decks 103 serially connected. As described in the first embodiment, the image forming apparatus 101 may establish communication with the feeding deck 103*a* connected beside the image forming apparatus 101 from among the plurality of feeding decks. The connection confirmation function portion 801*a* functions as an obtainment section which obtains information (e.g.: the configuration information 804*b*) indicating the feeding stage of each of the plurality of feeding decks. The CPU 151*a* or the job execution function portion 805*a* may determine whether the feeding stage designated by the print job is the manual feeding unit or the long sheet feeding deck connected to the feeding deck connected most upstream based on information obtained by the obtainment section. In this way, the image forming apparatus 101 may discriminate the presence or absence of the manual feeding unit or the long sheet feeding deck by executing communication with the feeding deck 103.

The IO port 153*d* or the communication I/F 155*a* function as a first communication section connected to a communication bus for communication with the plurality of feeding decks 103. The IO port 153*a* functions as a second communication section which communicates with the long sheet feeding deck 102 when the long sheet feeding deck 102 is connected beside the image forming apparatus 101. The instruction transmission function portion 807*a* may transmit a control command for controlling the manual feeding unit or the long sheet feeding deck to the feeding deck connected most upstream via the first communication section. By this, the image forming apparatus 101 may control a manual feeding unit or a long sheet feeding deck indirectly connected to the image forming apparatus 101.

There is a case in which the manual feeding unit is connected to the feeding deck 103. In this case, the control section (at least one processor) of the feeding deck 103 controls the manual feeding unit based on a control command transmitted from the image forming apparatus and received by the communication section. In a case where the manual feeding unit is connected to the image forming apparatus, the control section of the feeding deck 103 does not control the manual feeding unit.

There is a case where another feeding deck is connected downstream of the feeding deck 103 in the conveyance direction of the sheet. The control section of the feeding deck 103 receives from another feeding deck a control command for the manual feeding unit received from the image forming apparatus by another feeding deck. By this, the control section of the feeding deck 103 may control the manual feeding unit.

The connection confirmation function portion 801*a* may determine whether or not there is a possibility that another feeding apparatus is connected to the respective feeding decks based on information obtained from each of the plurality of feeding decks 103. Furthermore, the connection confirmation function portion 801*a* may query and obtain information relating to another feeding apparatus in relation to a feeding deck, from among the plurality of feeding decks, that the other feeding apparatus may be connected to. Since another feeding apparatus such as the manual feeding unit 104 or the long sheet feeding deck 102 is not directly connected to the image forming apparatus 101, it had not been possible for the image forming apparatus 101 to obtain information related to the other feeding apparatus. For this reason, the image forming apparatus 101 is configured such that information related to another feeding apparatus can be obtained by querying to the feeding deck that another feeding apparatus may be connected to.

The feeding deck 103 is one example of a feeding apparatus connected to the upstream side of the image forming apparatus 101 in the conveyance direction of the sheet P. The IO port 153*b* or the communication control function portion 803*b* function as a communication section which communicates with the image forming apparatus 101. The feeding section (e.g.: the manual feeding unit 104 and the long sheet feeding deck 102), which is to be directly connected to the image forming apparatus 101, may be connected to the upstream side of the feeding apparatus in conveyance direction of the sheet P. In this case, the CPU 152*b* functions as a control section (at least one processor) which controls the feeding section based on a control command that is transmitted by the image forming apparatus 101 and received by the communication section. By this, the image forming apparatus 101 is configured such that the manual feeding unit 104 or the long sheet feeding deck 102 when connected to the feeding deck 103 can be controlled. In other words, a long cable directly connecting the image forming apparatus 101 to such feeding sections is unnecessary and a short cable through which communication between the image forming apparatus 101 and the feeding apparatus is possible may be present. Accordingly, usability is further improved.

The CPU 151*b* is a control section of the feeding apparatus, from among the one or more feeding apparatuses connected in series to the image forming apparatus 101, which is connected farthest from the image forming apparatus and to which the feeding section is connected. In the case of FIG. 2B, the CPU 151*b* of the feeding deck 103*a* functions as the control section. In the case of FIG. 2C, the CPU 152*b* of the feeding deck 103*b* functions as the control section. In this way, a feeding section control function is provided in the feeding deck 103 to which a feeding section such as the manual feeding unit 104 or the long sheet feeding deck 102 is connected. By this, the image forming apparatus 101 is enabled to indirectly control a feeding section such as the manual feeding unit 104 or the long sheet feeding deck 102 via the CPU 151*b*.

As illustrated in FIG. 2B and FIG. 2C, a feeding apparatus connected closest to the image forming apparatus from among one or a plurality of feeding apparatuses is connected directly to the image forming apparatus by a communication line (e.g.: the cable 17*a*). Two feeding apparatuses adjacent to the plurality of the feeding apparatuses are also directly connected by the communication line (e.g.: the cable 17*b*). The control command (e.g.: a feeding command) may be transferred to the feeding apparatus connected farthest from the image forming apparatus 101 via the communication line. By this, it is possible for the image forming apparatus 101 to pass a control command to the CPU 151*b* which controls a feeding section such as the manual feeding unit 104 or the long sheet feeding deck 102.

When the CPU 151*b* of the control unit 150*b* receives the control command for the feeding section issued by the image forming apparatus 101, the CPU 151*b* may determine whether or not the feeding section can be directly controlled by the control section. In a case where the feeding section can be directly controlled by the CPU 151*b*, the CPU 151*b* may control the feeding section in accordance with the control command. In a case where the feeding section cannot be directly controlled by the control section, the CPU 151*b* may transfer the control command to another feeding apparatus connected to the upstream side of a feeding apparatus to which the control section is provided.

The ASIC 154*b* may additionally have a driving circuit which drives a driving source (e.g.: the motor 161) arranged in the feeding section. By this, the feeding deck 103 may drive a feeding section such as the manual feeding unit 104 or the long sheet feeding deck 102.

The CPU 152*b* may detect whether or not the feeding section is connected to the feeding apparatus. When it is detected that the feeding section is connected to the feeding apparatus, the CPU 151*b* may report to the image forming apparatus 101 that the feeding section is connected to the feeding apparatus. By this, the image forming apparatus 101 is configured such that another feeding apparatus connected to the feeding apparatus can be recognized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-123132, filed Jul. 1, 2019, which is hereby incorporated by reference herein in its entirety.

What is claimed is:

1. An image forming system comprising an image forming apparatus and a feeding apparatus configured to feed a sheet to the image forming apparatus, the image forming apparatus comprising:

a first mounting surface to which either a feeding apparatus of a first type or a feeding apparatus of a second type can be connected;

a first signal terminal configured to output a control signal from the image forming apparatus to the feeding apparatus of the first type in a case where the feeding apparatus of the first type is connected to the first mounting surface;

a second signal 2terminal configured to communicate a signal with the feeding apparatus of the second type in a case where the feeding apparatus of the second type is connected to the first mounting surface;

an acceptance port configured to accept a sheet fed from the feeding apparatus of the first type or of the second type; and at least one first processor configured to generate a control signal to be outputted to the first signal terminal or the second signal terminal, the feeding apparatus of the second type comprising:

a second mounting surface to which the feeding apparatus of the first type can connect;

a third signal terminal configured to be connected with the second signal terminal via a first cable; and a fourth signal terminal configured to output a control signal to the feeding apparatus of the first type in a case where the feeding apparatus of the first type is connected to the second mounting surface, wherein the feeding apparatus of the first type comprises:

a fifth signal terminal configured to be connected to the first signal terminal of the image forming apparatus via a second cable in a case where the feeding apparatus of the first type is connected to the first mounting surface of the image forming apparatus, and connected to the fourth signal terminal of the feeding apparatus of the second type via the second cable in a case where the feeding apparatus of the first type is connected to the second mounting surface of the feeding apparatus of the second type, wherein the at least one first processor is configured to:

in a case where the feeding apparatus of the first type is connected to the first mounting surface, output, to the feeding apparatus of the first type via the first signal terminal, a control signal, and in a case where the feeding apparatus of the first type is connected to the second mounting surface, output, to the feeding apparatus of the second type via the second signal terminal, a control command for controlling the feeding apparatus of the first type, and wherein the feeding apparatus of the second type is configured to:

in a case where the feeding apparatus of the first type is connected to the second mounting surface, output, to the feeding apparatus of the first type via the fourth signal terminal, a control signal based on a control command for controlling the feeding apparatus of the first type outputted from the image forming apparatus.

2. The image forming system according to claim 1, wherein the feeding apparatus of the second type comprises at least one second processor configured to convert a control command for controlling the feeding apparatus of the first type received from the image forming apparatus into a control signal that the feeding apparatus of the first type can receive, and to output the control signal to the feeding apparatus of the first type from the fourth signal terminal.

3. The image forming system according to claim 1, wherein the at least one first processor is configured to, based on a signal of the first signal terminal or the second signal terminal, discriminate a type of a feeding apparatus connected to the first mounting surface, and wherein the at least one first processor discriminates whether the feeding apparatus of the first type is connected or the feeding apparatus of the second type is connected to the first mounting surface based on a discrimination result.

4. The image forming system according to claim 3, wherein when the at least one first processor discriminates that the feeding apparatus of the second type is connected to the first mounting surface, the at least one first processor transmits, to the feeding apparatus of the second type via the second signal terminal, a query signal for querying whether the feeding apparatus of the first type is connected to the second mounting surface of the feeding apparatus of the second type, receives from the feeding apparatus of the second type a response signal in response to the query signal, and based on the response signal, discriminates whether the feeding apparatus of the first type is connected to the second mounting surface of the feeding apparatus of the second type.

* * * * *